United States Patent
Gajiwala et al.

(10) Patent No.: US 10,936,073 B1
(45) Date of Patent: *Mar. 2, 2021

(54) SYSTEM AND METHOD FOR GENERATING HIGH-FREQUENCY AND MID-FREQUENCY AUDIBLE SOUND VIA PIEZOELECTRIC ACTUATORS OF A HAPTIC KEYBOARD

(71) Applicant: Dell Products, LP, Round Rock, TX (US)

(72) Inventors: Priyank Gajiwala, Austin, TX (US); Michiel Knoppert, Amsterdam (NL); James H. Hallar, Austin, TX (US); Thomas M. Hinskens, Utrecht (NL); Frank van Valkenhoef, Hertogenbosch (NL)

(73) Assignee: Dell Products, LP, Round Rock, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/779,567

(22) Filed: Jan. 31, 2020

(51) Int. Cl.
*G06F 3/01* (2006.01)
*H04R 17/00* (2006.01)
(Continued)

(52) U.S. Cl.
CPC ............ *G06F 3/016* (2013.01); *G06F 3/0219* (2013.01); *G06F 3/0414* (2013.01); *H04R 17/00* (2013.01)

(58) Field of Classification Search
CPC ...... G06F 3/016; G06F 3/0219; G06F 3/0414; H04R 17/00
See application file for complete search history.

(56) References Cited

U.S. PATENT DOCUMENTS

| 4,618,797 | A | | 10/1986 | Cline | |
|---|---|---|---|---|---|
| 4,633,123 | A | * | 12/1986 | Radice | ............... H03K 17/9643 310/339 |

(Continued)

FOREIGN PATENT DOCUMENTS

| JP | 2014164610 A | 9/2014 |
|---|---|---|
| KR | 100442116 B1 | 7/2004 |

(Continued)

OTHER PUBLICATIONS

Rekimoto, J., et al., "PreSensell: Bi-directional Touch and Pressure Sensing Interactions with Tactile Feedback," Apr. 2006, 6 pages.

(Continued)

*Primary Examiner* — Munear T Akki
(74) *Attorney, Agent, or Firm* — Prol Intellectual Property Law, PLLC; H. Kenneth Prol

(57) ABSTRACT

A haptic keyboard based sound system of an information handling system comprising a coversheet to identify a plurality of key locations of a haptic keyboard and a first key having a piezoelectric element for haptic tactile feedback upon key actuation, a support layer, a contact foil placed between the coversheet and support layer, and a haptic feedback and piezo sound controller operatively coupled to the contact foil to receive the mid-frequency portion of an audio signal and the high frequency portion of the audio signal from an audio controller operably connected to the haptic feedback and piezo sound controller, and send a piezo audio signal to the piezoelectric element to cause the piezoelectric element to generate a mid-frequency and high-frequency sound audio according to the received mid-frequency portion of an audio signal and the high frequency portion of the audio signal.

20 Claims, 9 Drawing Sheets

(51) Int. Cl.
*G06F 3/041* (2006.01)
*G06F 3/02* (2006.01)

(56) References Cited

U.S. PATENT DOCUMENTS

| | | |
|---|---|---|
| 4,857,887 A | 8/1989 | Iten |
| 5,374,449 A * | 12/1994 | Buhlmann .......... H01L 41/1132 427/100 |
| 5,463,388 A | 10/1995 | Boie |
| 5,825,352 A | 10/1998 | Bisset |
| 5,861,583 A | 1/1999 | Schediwy |
| 5,887,995 A | 3/1999 | Holehan |
| 6,147,680 A | 11/2000 | Tareev |
| 6,188,391 B1 | 2/2001 | Seely |
| 6,239,790 B1 | 5/2001 | Martinelli |
| 6,532,824 B1 | 3/2003 | Ueno |
| 6,574,095 B2 | 6/2003 | Suzuki |
| 6,680,731 B2 | 1/2004 | Gerpheide |
| 6,703,550 B2 | 3/2004 | Chu |
| 6,822,635 B2 | 11/2004 | Shahoian |
| 6,882,337 B2 | 4/2005 | Shetter |
| 7,336,260 B2 | 2/2008 | Martin |
| 7,439,962 B2 | 10/2008 | Reynolds |
| 7,486,279 B2 | 2/2009 | Wong |
| 7,523,410 B2 | 4/2009 | Rekimoto |
| 7,535,454 B2 | 5/2009 | Jasso |
| 7,741,979 B2 | 6/2010 | Schlosser |
| 7,808,488 B2 | 10/2010 | Martin |
| 8,144,453 B2 | 3/2012 | Brown |
| 8,159,461 B2 | 4/2012 | Martin |
| 8,164,573 B2 | 4/2012 | DaCosta |
| 8,199,033 B2 | 6/2012 | Peterson |
| 8,248,277 B2 | 8/2012 | Peterson |
| 8,248,278 B2 | 8/2012 | Schlosser |
| 8,279,052 B2 | 10/2012 | Heubel |
| 8,294,600 B2 | 10/2012 | Peterson |
| 8,294,677 B2 | 10/2012 | Wu |
| 8,373,664 B2 | 2/2013 | Wright |
| 8,477,113 B2 | 7/2013 | Wu |
| 8,508,487 B2 | 8/2013 | Schwesig |
| 8,542,134 B2 | 9/2013 | Peterson |
| 8,581,710 B2 | 11/2013 | Heubel |
| 8,633,916 B2 | 1/2014 | Bernstein |
| 8,674,941 B2 | 3/2014 | Casparian |
| 8,749,507 B2 | 6/2014 | DaCosta |
| 8,773,356 B2 | 7/2014 | Martin |
| 8,797,295 B2 | 8/2014 | Bernstein |
| 8,842,091 B2 | 9/2014 | Simmons |
| 9,274,660 B2 | 3/2016 | Bernstein |
| 9,280,248 B2 | 3/2016 | Bernstein |
| 9,318,006 B2 | 4/2016 | Heubel |
| 9,336,969 B2 | 5/2016 | Takashima |
| 9,400,582 B2 | 7/2016 | Bernstein |
| 9,477,342 B2 | 10/2016 | Daverman |
| 9,535,557 B2 | 1/2017 | Bernstein |
| 9,829,982 B2 | 11/2017 | Bernstein |
| 10,089,840 B2 | 10/2018 | Moussette |
| 10,120,450 B2 | 11/2018 | Bernstein |
| 2004/0020754 A1 * | 2/2004 | Sullivan ............... H01H 13/702 200/314 |
| 2006/0109255 A1 | 5/2006 | Chen |
| 2007/0063987 A1 | 3/2007 | Sato |
| 2007/0152974 A1 * | 7/2007 | Kim .................. G06F 3/016 345/168 |
| 2007/0273671 A1 | 11/2007 | Zadesky |
| 2008/0098456 A1 | 4/2008 | Alward |
| 2008/0202824 A1 | 8/2008 | Philipp |
| 2008/0259046 A1 | 10/2008 | Carsanaro |
| 2009/0002178 A1 | 1/2009 | Guday |
| 2009/0243817 A1 | 10/2009 | Son |
| 2009/0315853 A1 * | 12/2009 | Yang .................. G06F 3/045 345/174 |
| 2009/0315854 A1 | 12/2009 | Matsuo |
| 2010/0089735 A1 | 4/2010 | Takeda |
| 2010/0102830 A1 | 4/2010 | Curtis |
| 2010/0110018 A1 | 5/2010 | Faubert |
| 2010/0128002 A1 | 5/2010 | Stacy |
| 2012/0062491 A1 | 3/2012 | Coni |
| 2012/0092263 A1 | 4/2012 | Peterson |
| 2013/0249802 A1 | 9/2013 | Yasutake |
| 2014/0300551 A1 * | 10/2014 | Purcocks .......... H01H 13/702 345/168 |
| 2014/0340208 A1 * | 11/2014 | Tan ................. H01H 13/83 340/407.2 |
| 2014/0340209 A1 * | 11/2014 | Lacroix ............ H04R 3/14 340/407.2 |
| 2015/0185842 A1 | 7/2015 | Picciotto |
| 2015/0338886 A1 * | 11/2015 | Seo ................. G06F 3/0213 361/679.09 |
| 2017/0269688 A1 | 9/2017 | Chan |
| 2018/0074694 A1 | 3/2018 | Lehmann |
| 2019/0073036 A1 | 3/2019 | Bernstein |

FOREIGN PATENT DOCUMENTS

| | | |
|---|---|---|
| KR | 20040081697 A | 9/2004 |
| WO | 2004/042685 A2 | 5/2004 |
| WO | 2004/042693 A1 | 5/2004 |
| WO | 2005/057546 A1 | 6/2005 |
| WO | 2011/056752 A1 | 5/2011 |
| WO | 2011/071837 A2 | 6/2011 |

OTHER PUBLICATIONS

Rekimoto, J. et al., "PreSense: Interaction Techniques for Finger Sensing Input Devices," UIST '03 Vancouver, BC, Canada, Nov. 2003, pp. 203-212, ACM 1-58113-636-6/03/0010.

Holleis, P. et al., "Studying Applications for Touch-Enabled Mobile Phone Keypads," Proceedings of the Second International Conference on Tangible and Embedded Interaction (TEI'08), Feb. 18-20, 2008, Bonn, Germany, pp. 15-18.

Westerman, W. et al., "Multi-Touch: A New Tactile 2-D Gesture Interface for Human-Computer Interaction," Proceedings of the Human Factors and Ergonomics Society 45th Annual Meeting, Oct. 2001, pp. 632-636.

\* cited by examiner

SYSTEM AND METHOD FOR GENERATING HIGH-FREQUENCY AND MID-FREQUENCY AUDIBLE SOUND VIA PIEZOELECTRIC ACTUATORS OF A HAPTIC KEYBOARD

FIELD OF THE DISCLOSURE

The present disclosure generally relates to a key switch assembly of, for example, an information handling system. The present disclosure more specifically relates to generation of audible high-frequency or mid-frequency sound at one or more piezoelectric elements of a haptic keyboard or touchpad assembly.

BACKGROUND

As the value and use of information continues to increase, individuals and businesses seek additional ways to process and store information. One option available to clients is information handling systems. An information handling system generally processes, compiles, stores, and/or communicates information or data for business, personal, or other purposes thereby allowing clients to take advantage of the value of the information. Because technology and information handling may vary between different clients or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific client or specific use, such as e-commerce, financial transaction processing, airline reservations, enterprise data storage, or global communications. In addition, information handling systems may include a variety of hardware and software components that may be configured to process, store, and communicate information and may include one or more computer systems, data storage systems, and networking systems. The information handling system may include telecommunication, network communication, and video communication capabilities. Further, the information handling system may include a keyboard or other input or output devices such as cursor control devices for manual input of information by the user.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings may indicate similar or identical items.

DETAILED DESCRIPTION OF THE DRAWINGS

Figure 1:
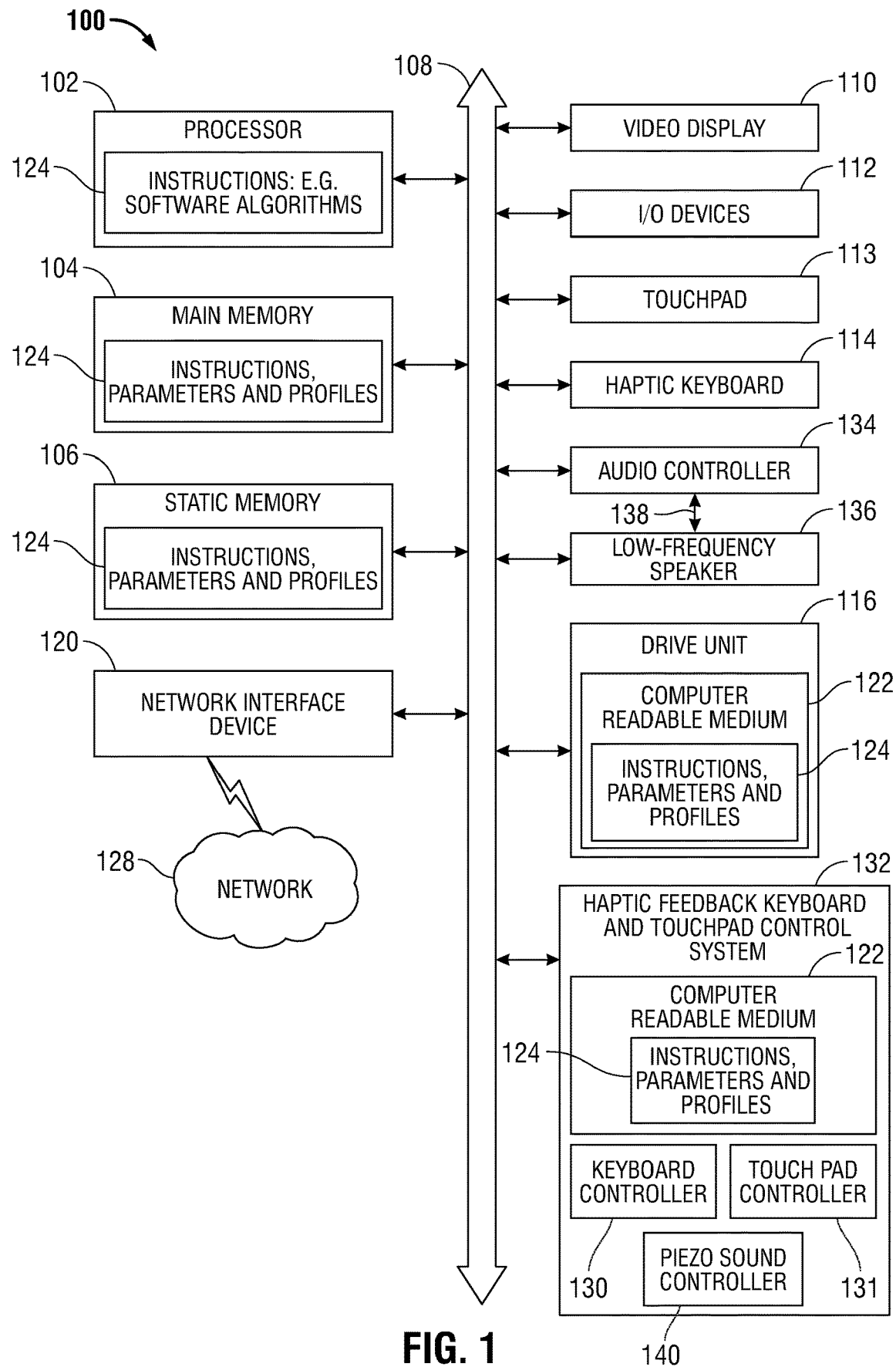
FIG. 1 is a block diagram illustrating an information handling system according to an embodiment of the present disclosure.

The following description in combination with the Figures is provided to assist in understanding the teachings disclosed herein. The description is focused on specific implementations and embodiments of the teachings, and is provided to assist in describing the teachings. This focus should not be interpreted as a limitation on the scope or applicability of the teachings.

User demand drives the market for mobile information handling systems toward ever-slimmer, more lightweight laptop devices, prompting a need for ever-thinner keyboards and laptop bases. A solid-state piezoelectric keyboard provides a thinner, more light-weight improvement over traditional scissor mechanism keyboards. The use of piezoelectric elements within the keyboard may eliminate the use of other devices such as a scissor mechanism that are used to maintain a keycap of a key above an electrical connection or for a dive board type mechanism under a touchpad. Instead, such piezoelectric elements may reduce or eliminate those mechanical elements that may fail after a number of actuations while also reducing the thickness of the keyboard or the touchpad itself. Instead of the keys of the keyboard requiring travel of a scissor mechanism within a C-cover of the information handling system, the relatively thinner keys defined (either physically or visibly) on the solid-state keyboard of the presently-described information handling system may reduce the physical thickness of the keyboard within the information handling system. Further, the solid-state touchpad may eliminate the dive board mechanism and underlying click switch for selection of items via the mechanically actuated touchpad. This may enable a thinner, more streamlined information handling system.

Embodiments of the present disclosure provide for a keyboard of an information handling system. The keyboard may include, in an embodiment, a coversheet to identify an actuation location of an input actuation device. In an embodiment a support layer may be placed underneath the coversheet to support the coversheet and other layers within the keyboard. The keyboard may, in an embodiment, include a contact foil placed between the coversheet and support layer. In the embodiments presented herein, the keyboard may include a piezoelectric element placed between the contact foil and support layer to receive an applied mechanical stress at the actuation location of the input actuation device. The keyboard of the information handling system, in an embodiment, may include a controller of the information handling system operatively coupled to the contact foil to receive a piezo actuation signal in the form of an electric charge from the piezoelectric element placed under the mechanical stress. The controller may send a responsive haptic feedback control signal to the piezoelectric element varying in polarity, voltage or current to cause the piezoelectric element to provide haptic feedback at the actuation location.

During operation of the solid-state keyboard or touchpad of the information handling system described in embodiments herein, the controller receives the piezo actuation signal indicating a key of the keyboard has been pressed down or actuated by a user, and sends an electrical charge in the form of a haptic feedback control signal back to the piezoelectric element. Upon application of the haptic feedback control signal on the piezoelectric element by the controller, the piezoelectric element may be mechanically stretched or compressed so as to create a haptic feedback event such as the piezoelectric element warping up or down and returning to its pre-deformed state. This warping of the layers of the piezoelectric element causes the user to hear an audible haptic sound (e.g., click, or buzz, or tone), and feel a haptic sensation at the actuated key or the specific location where the user pressed in order to actuate a key or touchpad. This audible haptic sound and haptic feedback against the user's finger causes a sensation of pressing a mechanical key thereby creating a feeling and sound effect to a user that the key was pressed or that a touchpad has been clicked to select an item such as one displayed on a display screen.

In some embodiments of the present disclosure, such an audible haptic response may be generated in response to a received haptic actuation indicator signal, other than the piezo actuation signal received by the controller indicating the piezoelectric element has been deformed under mechanical stress. For example, the controller may transmit a piezo audio signal causing a piezoelectric element to generate an audio sound for audible playback. Such an audio signal in an example embodiment may take the form of a music or video file (e.g., MP3, MPEG4, AVI, streaming video, etc.) and may include code instructions for the playback of audible sound at multiple frequencies. Optimal placement of speakers with respect to a user or listener depends upon the frequency ranges of sounds emitted by those speakers. For example, the location on an information handling system with respect to the user in which a higher frequency speaker may be placed, in order to deliver optimal high-frequency sound to the user, may be more limited than the locations in which a low-frequency speaker may be placed due to the nature of the longer waves of low frequency sound. As a consequence, speakers emitting sound in the mid-frequency and high-frequency ranges may be placed in a limited number of places within a laptop chassis in order to optimize a user's audible experience. In contrast, low-frequency speakers may be placed in several locations within the laptop chassis that are not optimal for the mid-frequency and high-frequency speakers, but deliver optimal low-frequency sound quality, nonetheless. Traditional laptop configurations employ speakers that are each designed and placed within the laptop chassis to play sound within the full range of frequencies. A solution is needed to play high-frequency and mid-frequency sounds from a portion of the chassis pointing toward the user during use, allowing for movement of an additional low-frequency speaker to areas within the chassis that do not provide optimal placement for mid-frequency or high-frequency speakers. Further, according to embodiments herein, then a richer or deeper low frequency sound may be realized by enabling use of the full volume of the system speaker for only low frequency sound in some embodiments.

Embodiments of the present disclosure address this issue by emitting high-frequency and mid-frequency sounds via the piezoelectric elements situated beneath the haptic keyboard, the touchpad, or other portions of the base chassis cover surrounding the haptic keyboard and the touchpad. Each of these areas in embodiments described herein may be capable of emitting sound in varying tones based on polarity, magnitude, and frequency of voltages applied thereto by one or more controllers, and each of these areas may be facing a user during use. Additionally, a low-frequency speaker (e.g., woofer) may be placed within one of several areas within the base chassis of the information handling system where traditional speakers also covering medium frequency or high frequency sound would not be placed for effective audio quality. In other words, the low-frequency speaker may be placed in a location that is more optimal for the overall configuration of the information handling system, resulting in slimmer, more lightweight devices, or freeing up locations for placement for addition components such as batteries while still providing rich audio, for example.

The overall thickness of the information handling system may be reduced so as to decrease the size and weight of the information handling system with the haptic keyboard and haptic touchpad of embodiments according to the present disclosure. In other embodiments, because the keyboard described herein has a reduced thickness, the space within the information handling system used to house other components, such as a battery, of the information handling system may be increased allowing for the increase in size of these components or the inclusion of additional components within the chassis of the information handling system.

Turning now to the figures, FIG. 1 illustrates an information handling system 100 similar to information handling systems according to several aspects of the present disclosure. In the embodiments described herein, an information handling system includes any instrumentality or aggregate of instrumentalities operable to compute, classify, process, transmit, receive, retrieve, originate, switch, store, display, manifest, detect, record, reproduce, handle, or use any form of information, intelligence, or data for business, scientific, control, entertainment, or other purposes. For example, an information handling system 100 may be a personal computer, mobile device (e.g., personal digital assistant (PDA) or smart phone), server (e.g., blade server or rack server), a consumer electronic device, a network server or storage device, a network router, switch, or bridge, wireless router, or other network communication device, a network connected device (cellular telephone, tablet device, etc.), IoT computing device, wearable computing device, a set-top box (STB), a mobile information handling system, a palmtop computer, a laptop computer, a desktop computer, a communications device, an access point (AP), a base station transceiver, a wireless telephone, a control system, a camera, a scanner, a printer, a pager, a personal trusted device, a web appliance, or any other suitable machine capable of executing a set of instructions (sequential or otherwise) that specify actions to be taken by that machine, and may vary in size, shape, performance, price, and functionality.

In a networked deployment, the information handling system 100 may operate in the capacity of a server or as a client computer in a server-client network environment, or as a peer computer system in a peer-to-peer (or distributed) network environment. In a particular embodiment, the information handling system 100 may be implemented using electronic devices that provide voice, video or data communication. For example, an information handling system 100 may be any mobile or other computing device capable of executing a set of instructions (sequential or otherwise) that specify actions to be taken by that machine. Further, while a single information handling system 100 is illustrated, the term "system" shall also be taken to include any collection of systems or sub-systems that individually or jointly execute a set, or multiple sets, of instructions to perform one or more computer functions.

The information handling system may include memory (volatile (e.g. random-access memory, etc.), nonvolatile (read-only memory, flash memory etc.) or any combination thereof), one or more processing resources, such as a central processing unit (CPU), a graphics processing unit (GPU), hardware or software control logic, or any combination thereof. Additional components of the information handling system 100 may include one or more storage devices, one or more communications ports for communicating with external devices, as well as, various input and output (I/O) devices 112, such as a keyboard 114, a low-frequency speaker 136, a touchpad 113, one or more speakers, one or more microphones, ambient light sensors, a mouse, a video/graphic display 110, or any combination thereof. The information handling system 100 may also include one or more buses operable to transmit communications between the various hardware components. Portions of an information handling system 100 may themselves be considered information handling systems 100.

The information handling system 100 may also include an audio controller 134 in an embodiment that may receive a digital representation of an audio signal. This may take the form of a pulse code modulation of a recorded analog audio signal, for example. Such a pulse code modulation may provide one or more oscillating sound signals (e.g., sine waves) having amplitudes and frequencies that vary over time, as the tone and volume of audible sound generated thereby also varies. In other words, the digital representation of an audio signal may be received at the audio controller in a time domain, where the data of the digital representation plots amplitude of voltage or current over time.

As described herein, such an audio signal may be separated into low-frequency, high-frequency, and mid-frequency audio signals, where different speakers or piezoelectric elements are designated to produce sound in accordance with designated frequency ranges. In order to achieve this, the audio controller 134 in an embodiment may transform the digital pulse code modulated sound data in a received audio signal from the time domain to the frequency domain, where the amplitude of voltage or current is plotted or analyzed with respect to frequency. In such a way, the audio controller 134 may identify portions of the digital audio signal falling into each of several frequency domains. For example, upon transforming the digital pulse code modulated sound data to the frequency domain, the audio controller 134 in an embodiment may pass the frequency-domain data through a low-pass band filter to isolate portions of the audio signal having a frequency below a low frequency band cutoff (e.g. 500 Hz+/−200 Hz), to produce a low-frequency audio signal. Upon such a filtering, the audio controller may transform the frequency-domain, low-frequency audio signal back into a time-domain representation that may be applied to a traditional speaker. The audio controller 134 may then transmit the time-domain low-frequency audio signal to the low-frequency speaker 136 of the information handling system via speaker line 138 (e.g., coaxial cable) or via bus 108. The low-frequency speaker 136 in such an embodiment may then emit low-frequency audible sound (e.g., below 500 Hz) according to the digital pulse code modulated sound data (e.g., audio signal).

In one example, upon transforming the digital pulse code modulated sound data to the frequency domain, the audio controller in an embodiment may pass the remaining frequency-domain data representing mid-frequency and high frequency audio signals to a piezo audio controller 140. The audio controller 134 in such an embodiment may then transform the frequency domain high-frequency audio signal and frequency domain mid-frequency audio signal back into the time domain, to produce a high-frequency audio signal and a mid-frequency audio signal that can be understood by the piezo sound controller 140 in an embodiment. The processed mid and high frequency audio signal in such an embodiment may associate a plurality of voltage amplitudes (magnitudes) with a plurality of points in time for all frequencies over a mid and high frequency range (e.g. >the low frequency cutoff). Each of these signals may then be transmitted to the piezo sound controller 140 of the haptic feedback keyboard and touchpad control system 132 via bus 108.

As another example, upon transforming the digital pulse code modulated sound data to the frequency domain, the audio controller in an embodiment may pass the frequency-domain data through a high-pass band filter to remove portions of the frequency-domain data falling below a certain, preset threshold frequency in an embodiment. More specifically, a first high-pass filter may be set to only pass frequencies above a low frequency band cutoff (e.g. 500 Hz+/−200 Hz), which would include high-frequency audio signals and mid-frequency audio signals. This signal may be further separated by sending it through additional filters. For example, the audio controller may apply a second high-pass filter to only pass signals having a frequency above a high frequency band cutoff (e.g. 2,000 Hz+/−600 Hz), to produce a high-frequency audio signal. As another example, the audio controller may apply a low-pass filter to only pass signals at or below a high frequency band cutoff (e.g. 2,000 Hz+/−600 Hz) or a bandpass filter to produce a mid-frequency audio signal. The audio controller in such an embodiment may then transform the frequency domain high-frequency audio signal, and frequency domain mid-frequency audio signal back into the time domain, to produce a high-frequency audio signal and a mid-frequency audio signal that can be understood by the haptic feedback and piezo sound controller in an embodiment. The processed high-frequency audio signal in such an embodiment may associate a plurality of voltage amplitudes (magnitudes) with a plurality of points in time for all frequencies over a high frequency band cutoff (e.g. 2,000 Hz+/−600 Hz). The processed mid-frequency audio signal in such an embodiment may associate a plurality of voltage amplitudes (magnitudes) with a plurality of points in time for all frequencies between a low frequency band cutoff (e.g. 500 Hz+/−200 Hz) and a high frequency band cutoff (e.g. 2,000 Hz+/−600 Hz). Each of these signals may then be transmitted to the haptic feedback and piezo sound controller 140 of the haptic feedback keyboard and touchpad control system 132 via bus 108.

Information handling system 100 may include devices or modules that embody one or more of the devices or execute instructions for the one or more systems and modules described herein, and operates to perform one or more of the methods described herein. The information handling system 100 may execute code instructions 124 that may operate on servers or systems, remote data centers, or on-box in individual client information handling systems according to various embodiments herein. In some embodiments, it is understood any or all portions of code instructions 124 may operate on a plurality of information handling systems 100.

The information handling system 100 may include a processor 102 such as a central processing unit (CPU), control logic or some combination of the same. Any of the processing resources may operate to execute code that is either firmware or software code. Moreover, the information handling system 100 may include memory such as main memory 104, static memory 106, or other memory of computer readable medium 122 storing instructions 124 of the haptic feedback keyboard and touchpad control system 132, and drive unit 116 (volatile (e.g. random-access memory, etc.), nonvolatile memory (read-only memory, flash memory etc.) or any combination thereof. A processor 102 may further provide the information handling system with a system clock for which a time of day clock may be tracked along with any location detector such as global positioning system or in coordination with a network interface device 120 connecting to one or more networks 128. The information handling system 100 may also include one or more buses 108 operable to transmit communications between the various hardware components such as any combination of various input and output (I/O) devices.

The information handling system 100 may further include a video display 110. The video display 110 in an embodiment may function as a liquid crystal display (LCD), an organic light emitting diode (OLED), a flat panel display, or a solid-state display. Additionally, the information handling system 100 may include an input device 112, such as a cursor control device (e.g., mouse, touchpad 113, or gesture or touch screen input), and a keyboard 114. Various drivers and control electronics may be operatively coupled to operate input devices 112 such as the haptic keyboard 114 and haptic touchpad 113 according to the embodiments described herein. Further, the information handling system 100 may include input/output devices 112, such as one or more speakers or one or more microphones used along with the keyboard 114 or touchpad 113 of embodiments according to the present disclosure. Various drivers and control electronics may be operatively coupled to operate input devices 112 such as the speakers, microphones, as well as the haptic keyboard 114 and haptic touchpad 113 according to the embodiments described herein.

The network interface device shown as wireless adapter 120 may provide connectivity to a network 128, e.g., a wide area network (WAN), a local area network (LAN), wireless local area network (WLAN), a wireless personal area network (WPAN), a wireless wide area network (WWAN), or other network. Connectivity may be via wired or wireless connection. The wireless adapter 120 may operate in accordance with any wireless data communication standards. To communicate with a wireless local area network, standards including IEEE 802.11 WLAN standards, IEEE 802.15 WPAN standards, WWAN such as 3GPP or 3GPP2, or similar wireless standards may be used. In some aspects of the present disclosure, one wireless adapter 120 may operate two or more wireless links.

Wireless adapter 120 may connect to any combination of macro-cellular wireless connections including 2G, 2.5G, 3G, 4G, 5G or the like. Utilization of radiofrequency communication bands according to several example embodiments of the present disclosure may include bands used with the WLAN standards and WWAN carriers, which may operate in both licensed and unlicensed spectrums.

In some embodiments, software, firmware, dedicated hardware implementations such as application specific integrated circuits, programmable logic arrays and other hardware devices may be constructed to implement one or more of some systems and methods described herein. Applications that may include the apparatus and systems of various embodiments may broadly include a variety of electronic and computer systems. One or more embodiments described herein may implement functions using two or more specific interconnected hardware modules or devices with related control and data signals that may be communicated between and through the modules, or as portions of an application-specific integrated circuit. Accordingly, the present system encompasses software, firmware, and hardware implementations.

In accordance with various embodiments of the present disclosure, the methods described herein may be implemented by firmware or software programs executable by a controller or a processor system. Further, in an exemplary, non-limited embodiment, implementations may include distributed processing, component/object distributed processing, and parallel processing. Alternatively, virtual computer system processing may be constructed to implement one or more of the methods or functionalities as described herein.

The present disclosure contemplates a computer-readable medium that includes instructions, parameters, and profiles 124 or receives and executes instructions, parameters, and profiles 124 responsive to a propagated signal, so that a device connected to a network 128 may communicate voice, video or data over the network 128. Further, the instructions 124 may be transmitted or received over the network 128 via the network interface device or wireless adapter 120.

The information handling system 100 may include a set of instructions 124 that may be executed to cause the computer system to perform any one or more of the methods or computer-based functions disclosed herein. For example, instructions 124 may execute a haptic feedback keyboard and touchpad control system 132, software agents, or other aspects or components. Various software modules comprising application instructions 124 may be coordinated by an operating system (OS), and/or via an application programming interface (API). An example operating system may include Windows®, Android®, and other OS types. Example APIs may include Win 32, Core Java API, or Android APIs.

The disk drive unit 116 and the haptic feedback keyboard and touchpad 113 control system 132 may include a computer-readable medium 122 in which one or more sets of instructions 124 such as software may be embedded. Similarly, main memory 104 and static memory 106 may also contain a computer-readable medium for storage of one or more sets of instructions, parameters, or profiles 124 including haptic feedback modulation instructions that allow for a user to input a desired level of haptic feedback at a key or location on a touchpad 113. The disk drive unit 116 and static memory 106 may also contain space for data storage. Further, the instructions 124 may embody one or more of the methods or logic as described herein. For example, instructions relating to the haptic feedback keyboard and touchpad control system 132 software algorithms, processes, and/or methods may be stored here. In a particular embodiment, the instructions, parameters, and profiles 124 may reside completely, or at least partially, within the main memory 104, the static memory 106, and/or within the disk drive 116 during execution by the processor 102 of information handling system 100.

Main memory 104 may contain computer-readable medium, such as RAM in an example embodiment. An example of main memory 104 includes random access memory (RAM) such as static RAM (SRAM), dynamic RAM (DRAM), non-volatile RAM (NV-RAM), or the like, read only memory (ROM), another type of memory, or a combination thereof. Static memory 106 may contain computer-readable medium (not shown), such as NOR or NAND flash memory in some example embodiments. The haptic feedback keyboard and touchpad control system 132 may be stored in static memory 106, or the drive unit 116 on a computer-readable medium 122 such as a flash memory or magnetic disk in an example embodiment. While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding, or carrying a set of instructions for execution by a processor or that cause a computer system to perform any one or more of the methods or operations disclosed herein.

In a particular non-limiting, exemplary embodiment, the computer-readable medium may include a solid-state memory such as a memory card or other package that houses one or more non-volatile read-only memories. Further, the computer-readable medium may be a random-access memory or other volatile re-writable memory. Additionally, the computer-readable medium may include a magneto-optical or optical medium, such as a disk or tapes or other storage device to store information received via carrier wave signals such as a signal communicated over a transmission medium. Furthermore, a computer readable medium may store information received from distributed network resources such as from a cloud-based environment. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

The information handling system 100 may also include the haptic feedback keyboard and touchpad control system 132 that may be operably connected to the bus 108. The haptic feedback keyboard and touchpad control system 132 computer readable medium 122 may also contain space for data storage. The haptic feedback keyboard and touchpad control system 132 may, according to the present description, perform tasks related to transmitting haptic sound feedback control signals or piezo audio signals (e.g., high-frequency audio signal or mid-frequency audio signal) to piezoelectric elements of the haptic keyboard 114 or haptic touchpad 113 to cause the piezoelectric elements to generate haptic tactile feedback events or emit sound in the high-frequency and mid-frequency ranges via the haptic keyboard 114 or haptic touchpad 113. The haptic feedback keyboard and touchpad control system 132, in embodiments herein, may be a control system for either a haptic feedback keyboard 114 or for a haptic feedback touchpad system 113, or for both as shown in FIG. 1. For example, haptic feedback keyboard and touchpad control system 132 may include only a keyboard controller 130 for a haptic keyboard system or only a touchpad controller 131 for a haptic touchpad system 113 in some embodiments that do not implement a haptic system for both the keyboard or touchpad. In other embodiments, both the keyboard controller 130 and touchpad controller 131 may be implemented for haptic input/output systems as described herein.

In an embodiment, the haptic feedback and piezo sound controller 140, or a processor, or both may receive the high-frequency audio signal and the mid-frequency audio signal from the audio controller 134 via bus 108 and transmit these audio signals in the form of piezo audio signals or haptic sound feedback control signals to one or more piezoelectric elements of the haptic keyboard 114 or haptic touchpad 113. In one embodiment, upon application of the piezo audio signals or the haptic sound feedback control signals at the piezoelectric elements (i.e., having a specific current or voltage), the piezoelectric elements may generate sounds, such as mid or high frequency audio playback. In some embodiments, piezo audio signals may have been divided between mid frequency audio signals and high frequency audio signals and then associated with optimized locations for emission of either high-frequency or mid-frequency audio. In the various embodiments, the piezo audio signals may be directed to the piezoelectric elements may convert that haptic sound feedback control signal into a mechanical stress by, for example, causing the piezoelectric element to warp upward or warp downward. The mechanical stress of the piezoelectric element due to the application of the haptic sound feedback control signal to the piezoelectric element may be heard by a user as audible sound in the mid-frequency range (e.g., between a low frequency band cutoff and a high frequency band cutoff (e.g. 2,000 Hz+/−600 Hz) or in the high-frequency range (e.g., above a high frequency band cutoff (e.g. 2,000 Hz+/−600 Hz). In an embodiment, the keyboard controller 130 may execute instructions, parameter, and profiles 124 to enact the functions of the keyboard 114 as described herein. The haptic feedback keyboard and touchpad control system 132 in an embodiment may include one or more sets of instructions that, when executed by a haptic feedback and piezo sound controller 140, a processor, or both, causes a piezo audio signal, of specified current and voltage, to be applied to a piezoelectric element in accordance with high-frequency audio signals, mid-frequency audio signals, or both received from the audio controller 134.

In an embodiment, the haptic feedback keyboard and touchpad control system 132 may communicate with the main memory 104, the processor 102, the video display 110, the alpha-numeric input device 112, the audio controller 134, and the network interface device 120 via bus 108, and several forms of communication may be used, including ACPI, SMBus, a 24 MHZ BFSK-coded transmission channel, or shared memory. Keyboard or touchpad driver software, firmware, controllers and the like may communicate with applications on the information handling system 100. Similarly, speaker or microphone driver software, firmware, controllers and the like may communicate with applications on the information handling system 100 as well as with the piezo keyboard driver or touchpad driver in some embodiments herein.

In other embodiments, dedicated hardware implementations such as application specific integrated circuits, programmable logic arrays and other hardware devices may be constructed to implement one or more of the methods described herein. Applications that may include the apparatus and systems of various embodiments may broadly include a variety of electronic and computer systems. One or more embodiments described herein may implement functions using two or more specific interconnected hardware modules or devices with related control and data signals that may be communicated between and through the modules, or as portions of an application-specific integrated circuit. Accordingly, the present system encompasses software, firmware, and hardware implementations.

When referred to as a "system", a "device," a "module," a "controller," or the like, the embodiments described herein may be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCMCIA) card, or other such expansion card), or a system (such as a motherboard, a system-on-a-chip (SoC), or a stand-alone device). The system, device, controller, or module may include software, including firmware embedded at a device, such as an Intel® Core class processor, ARM® brand processors, Qualcomm® Snapdragon processors, or other processors and chipsets, or other such device, or software capable of operating a relevant environment of the information handling system. The system, device, controller, or module may also include a combination of the foregoing examples of hardware or software. In an embodiment an information handling system 100 may include an integrated circuit or a board-level product having portions thereof that may also be any combination of hardware and software. Devices, modules, resources, controllers, or programs that are in communication with one another need not be in continuous communication with each other, unless expressly specified otherwise. In addition, devices, modules, resources, controllers, or programs that are in communication with one another may communicate directly or indirectly through one or more intermediaries.

Figure 2:
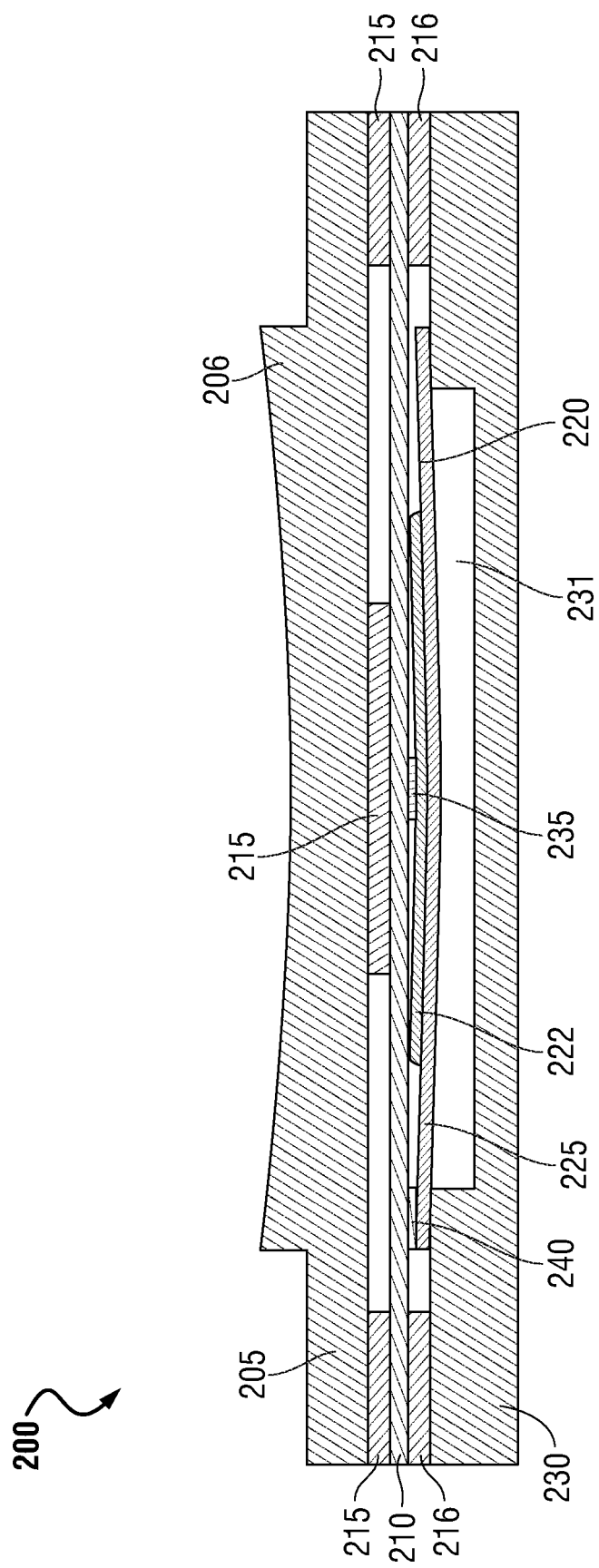
FIG. 2 is a side cut-out view of a key of a keyboard implementing a piezoelectric element according to an embodiment of the present disclosure.

FIG. 2 is a side cut-out view of a key 200 of a haptic feedback keyboard implementing a piezoelectric element according to an embodiment of the present disclosure. As described herein, one or more layers of the keyboard in embodiments of the present disclosure may provide haptic tactile feedback, haptic sound feedback, or audio sound by deforming a piezo element such that it generates audible sound waves or generates tactile haptic feedback movement. According to an embodiment, the key 200 may be formed of a plurality of layers, one layer of which is a piezoelectric element 220. Although FIG. 2 shows a cross-sectional view of a single key 200, the present specification contemplates that a keyboard may also include a plurality of these similar keys 200 arranged as, for example, a QWERTY-type keyboard. Consequently, FIG. 2 is not intended to be limiting but merely intended as a description of operation of any type of input device contemplated by the present disclosure.

The key 200 includes a coversheet 205. The coversheet 205 may be made of any type of elastically resilient material. The elastically resilient material may allow, at least, a portion of the key 200 to be deformed upon application of a pressure from a user's finger. Upon withdrawal of the pressure from the user's finger, the material the coversheet 205 is made of allows the coversheet 205 of the key 200 to bend back to its pre-deformed state. In an embodiment, the resilient material may allow the coversheet 205 to travel a minimal distance and still deform a piezoelectric element 220. For example, a distance of between 0.01 mm and 2 mm. In an embodiment, the distance is between 0.05 mm and 0.15 mm. In an embodiment, the distance is 0.1 mm.

In an embodiment, the shape of the coversheet 205 may have a selection of key pedestals 206 of various sizes and shaped so as to conform to a user's finger. In an embodiment, in order to shape the coversheet 205, the material used to form the coversheet 205 may be subjected to an injection molding process. As such, a top portion of the coversheet 205 may be formed to be ergonomically beneficial to a user's actuation such as by conforming to the user's fingers and including a pedestal 206 to highlight the key location, for example. In other embodiments, no key pedestals may be formed and a key location may be described in coversheet 205 via markings, depressions, key framing, or other methods. The injection molding process may be completed prior to the installation of the coversheet 205 into the remaining layers within the keyboard 200 as described herein. Any number of processes may be included with the injection molding process. In an embodiment, the injection molding process used to form the coversheet 205 may include forming a number of holes within a translucent sheet of acrylonitrile butadiene styrene (ABS). These holes may correlate with a number of keys on a keyboard. The formation of the coversheet 205 may continue with injection molding a translucent ABS through the holes to form a raised portion correlating with each of the number of keys on the keyboard. Opposite the raised portions a number of runners may be machined away to accommodate for receipt of other layers of the keyboard such as each of the piezoelectric elements. The surface of the coversheet on which the raised portions are formed may be painted and any number or type of graphics may be laser etched on each raised portion indicating a specific key of the keyboard.

In other embodiments, the coversheet of the C-cover may include a plurality of vias for keys 200 having a cover sheet 205 or cap for each key. A key pedestal 206 for each key 200 in a solid-state keyboard of the present embodiments may be disposed through the vias in the C-cover in such embodiments. Each haptic key of the haptic keyboard in such an embodiment may include a cover layer with portions similar to those described directly above that protrudes through the key vias in the coversheet 205. Layering under the coversheet may include material layers that are hydrophobic or have other properties. Though gaps between haptic keys and key vias may be minimized, such gaps may be useful for audio sound transmission, for cooling ventilation of the base chassis, or for allowing backlighting to frame the haptic keys. Similarly, a touchpad top touch interface layer may be attached under the coversheet 205 to seamlessly provide a designated touchpad area in the C-cover coversheet 205. Any combination of continuous coversheet for haptic keys and vias in the coversheet for placement of haptic keys of a keyboard coversheet layer are contemplated in various embodiments. Further, it is contemplated that in some embodiments one or the other of a haptic keyboard or haptic touchpad may be used with a keyboard having mechanically actuated or a touchpad with a mechanically actuated diving board mechanism.

The key 200 may further include a number of adhesive layers 215 that physically couple the various layers of the key 200 together. In an embodiment, a first adhesive layer 215 may be formed on the coversheet 205 to adhere the coversheet 205 to the contact foil 210. The first adhesive layer 215 may include the placement of the adhesive at locations that may enhance the movement and prevent the hindrance of the actuation of the coversheet 205. In a specific embodiment, the first adhesive layer 215 may include placing the adhesive along borders of the key 200 as well as placing the adhesive at a central location of the key 200.

The contact foil 210 may be adhered to the coversheet 205 and may be made of any elastically resilient material that, when the coversheet 205 of key 200 is actuated or the contact foil 210 is bent towards a lower portion of the key 200, returns to its original state when the key 200 is no longer being actuated. The contact foil in an embodiment may be a flexible material, such as polyethylene terephthalate (PET) serving as a polyester printed circuit board or other type of flexible printed circuit board, in several example embodiments. The contact foil 210 may include a number of metal traces formed on one or more of its surfaces that electrically and communicatively couple each of the corresponding piezoelectric element 220 of key 200 to a keyboard controller such as a processor of an information handling system that includes a haptic feedback keyboard control system such as described herein. Formation of metal traces may be made according to a variety of methods including photolithographic techniques for applying metal or lamination of copper strips or other metal layers.

In an embodiment, portions of the contact foil 210 may be physically coupled to a support plate 230 via a second layer of adhesive 216. The location of the placement of the second adhesive layer 216 may include placing the adhesive along borders of the key 200.

In an embodiment presented herein, the piezoelectric element 220 may include a first portion 222 that may be any solid piezoelectric material that accumulates an electric charge when a mechanical stress is applied to it or specifically, in the embodiments presented herein, when the solid material is deformed. Solid materials used to form the piezoelectric element 220 may include crystals, ceramics, or protein layers, among other types of materials. For ease of explanation, the piezoelectric element 220 may be made of a type of ceramic although the present specification contemplates the use of other types of piezoelectric materials.

The piezoelectric element 220 may be housed over a cavity 231 formed in the support plate 230. The piezoelectric element 220 may comprise two portions 222 and 225 each electrically coupled via electric contact points such as soldering points 235 and 240, respectively, to a different electrical trace on the surface of the contact foil 210. The first portion 222 may be a ceramic disk in an embodiment. Second portion 225 of the piezoelectric element 220 may be a metal plate or ring, such as a brass plate, that extends beyond the edges of cavity 231. The first portion 222 and the second portion 225 may be operatively coupled via adhesive including conductive adhesives. The soldering points 235 and 240 may be silver solder contact points for operative electrical coupling to metal traces on the surface of contact foil 210. As so oriented, the first soldering point 235 and second soldering point 240 may be formed to receive an electrical charge (e.g., piezo actuation signal) upon deflection of the piezoelectric element 220 as a user actuates the key 200. The brass plate 225 supports deflection of the piezoelectric element 220 into the cavity 231 to detect mechanical actuation of the key 200. In an embodiment, the support plate 230 may have a cavity 230 formed therein such that the piezoelectric element 220 may be allowed to be deflected therein when the key 200 is actuated by a user and cavity 231 may be an aperture or hole through support plate 230 or may be a depression or hole in support plate 230 that does not pass through 230.

In an embodiment presented herein, the piezoelectric element 220 may be any solid material that accumulates an electric charge when a mechanical stress is applied to it or specifically, in the embodiments presented herein, the solid material is deformed. Solid materials used to form the piezoelectric disk 222 or other piezoelectric material as part of a first portion 222 of the piezoelectric element 220 may include crystals, ceramics, biological matter, protein layers, among other types of materials. For ease of explanation, the piezoelectric disk material 222 may be made of a type of ceramic although the present specification contemplates the use of these other types of materials.

During operation of the key 200, the contact foil 210 may transmit the piezo actuation signal from the piezoelectric element 220 via the metal traces that conduct the electrical charge to the processor or other keyboard controller associated with the key 200. For example, as the piezoelectric disk material 222 is compressed by deflection and the metal plate or ring 225 warped downward toward the cavity 231 within support plate 230, a change in voltage may be detected. The piezo actuation signal (electrical charge) created when the user actuates the key 200 and the piezoelectric element 220 is subjected to a mechanical stress may be detected between soldering points 235 and 240. The piezo actuation signal (electrical charge) may be communicated down metal traces formed on the contact foil 210 to a controller (not shown).

The metal traces formed on the contact foil 210 may further be used to conduct a haptic feedback control signal or a piezo audio signal from the controller to the piezoelectric element 220 so that the voltage and current of the haptic feedback control signal may cause the piezoelectric element 220 to warp upward or downward at various magnitudes or at frequency or otherwise move as required to cause a specified haptic response (e.g., haptic tactile movement feedback or haptic sound feedback) felt or heard by the user via coversheet 205 or heard as specified by audio sound signals according to various embodiments. For example, this haptic feedback control signal or piezo audio signal may have a certain voltage, current, and polarity (−,+) sufficient to render the piezoelectric material of the piezoelectric element 220 to cause a haptic movement or sound. Such a haptic feedback control signal or a piezo audio signal may be a sine wave, a square wave, a pulsed signal, or other waveform of changing current, voltage, or polarity applied to the piezoelectric element 220 as required to generate haptic feedback or sound. This application of voltage in the haptic feedback control signal or piezo audio signal may cause an upward or downward warping of the piezoelectric element 220, and consequently, a haptic feedback (e.g., haptic movement feedback or haptic sound feedback) presented at the key 200 via the contact foil 210, adhesive 215, and coversheet 205 that the user may feel or hear. The controller in an embodiment may send the haptic feedback control signal or piezo audio signal to the piezoelectric element 220 via the metal traces formed on the contact foil 210, through the soldering points 235 and 240 and to a conductive layer of metallic plate or ring 225 formed below the piezoelectric disk material 222.

In one aspect of an embodiment, the piezo audio signal may be transmitted to the piezoelectric element 220 in order to initiate an audio function of some or all of the haptic keyboard or touchpad, specifically. For example, the piezo audio signal in an embodiment may comprise both a mid and high-frequency audio signal providing a varying magnitude of voltage to be applied to the piezoelectric element 220 over time in some embodiments. In another example, the piezo audio signal in an embodiment may comprise a high-frequency audio signal providing a varying magnitude of voltage to be applied to the piezoelectric element 220 over time in some embodiments. Such a high-frequency audio signal may be applied to one or more piezoelectric elements 220 of a haptic keyboard, touchpad, or C-cover of an information handling system previously identified as having an optimal location for emission of high-frequency sound in some embodiments. As yet another example, the piezo audio signal in an embodiment may comprise a mid-frequency audio signal providing a varying magnitude of voltage to be applied to the piezoelectric element 220 over time. Such a mid-frequency audio signal may be applied to one or more piezoelectric elements 220 of a haptic keyboard, touchpad, or C-cover of an information handling system associated with mid-frequency audio signals. Application of such varying magnitude (or amplitude) voltages to the piezoelectric elements 220 in such a way in an embodiment may cause the metallic plate or ring 225 in an embodiment to warp upwards or downwards so as to create pressure waves in the air surrounding the piezoelectric element 220, and thus, audible sound. Such audible sound in an embodiment may include tones emitted in either the high-frequency range, mid-frequency range, or both in accordance with the mid-frequency audio signal and high-frequency audio signal transmitted by the piezo sound controller.

FIG. 2 shows an image of a single key 200. The present specification contemplates that a plurality of keys 200 may be formed alongside each other in order to form, for example, a number pad, a keyboard, or a combination thereof. Consequently, although the features of the key 200 depicted in FIG. 2 apply to a single key 200, the present specification contemplates that any number of keys 200 may be formed on the keyboard so as to allow for the formation of an input device such as a keyboard. The keys 200 may be of any size (e.g., spacebar, tab key, or the like) and depending on size may include more than one piezoelectric element 220 associated with it. As the user actuates each of the keys 200, a haptic feedback (e.g., haptic sound feedback or haptic movement feedback) may be felt or heard by the user so as to present to the user a sensation that the key was pressed. This operation of key 200 may be conducted every time the user actuates the key 200.

The formation of the key 200 may, in the embodiments presented herein, provide for a keyboard that has a relatively shorter distance of key travel as compared to those keyboards that implement mechanical devices such as a scissor mechanisms and key caps. In an embodiment, the distance of travel of the key 200 may be smaller than 0.1 mm. With the shorter distance of key travel, the overall thickness of the keyboard placed within an information handling system may be reduced. This increases the available footprint within a base chassis of, for example, a notebook-type information handling system that may be used for more or larger components (e.g., batteries) to be placed within the base chassis. Additionally, or alternatively, the reduction in thickness of the keyboard may reduce the overall thickness of the information handling system improving the aesthetics of the design of the information handling system. This reduction in size of the information handling system may also result in the reduction of the size or weight of the information handling system thereby increasing the portability of the information handling system by the user. Further, in embodiments herein, the haptic key 200 may operate as a plurality of mid frequency and high frequency audio speakers as well which may further yield size or space use efficiency.

The keys 200 of the present embodiments also include no moving mechanical parts. With the absence of mechanical moving parts, the key 200 of the presently described embodiments may be relatively more robust thereby increasing the useful life of the key 200. This may increase user satisfaction over the useful lifetime of the information handling system.

Figure 3A:
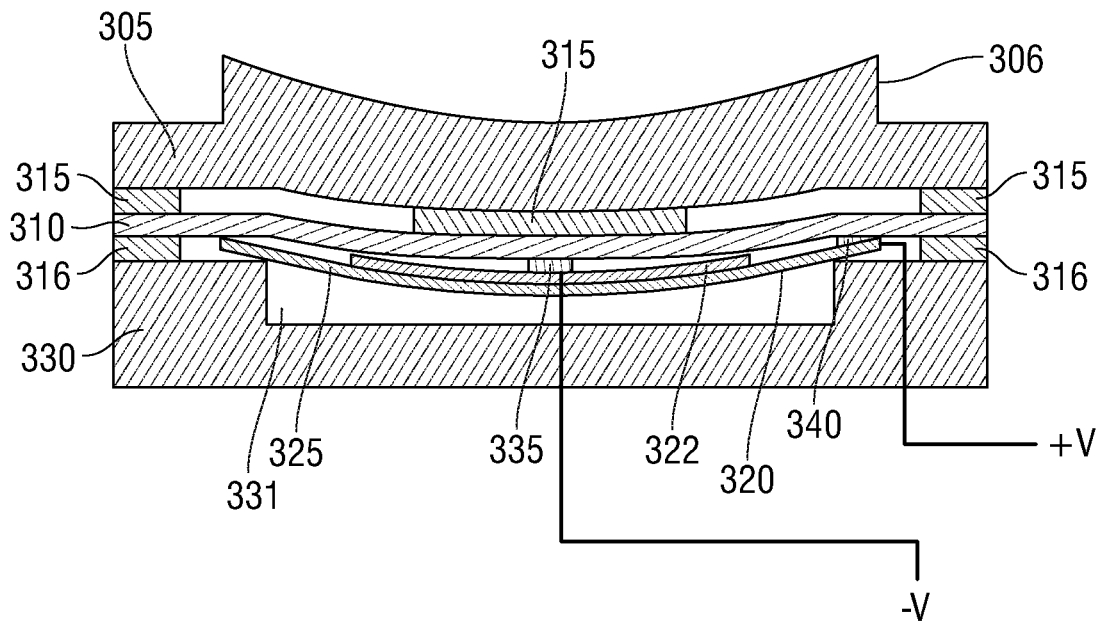
FIG. 3A is a side cut-out view of a key of a keyboard implementing a piezoelectric element in a downward warped position according to an embodiment of the present disclosure.

FIG. 3A is a side cut-out view of a key 300 of a haptic feedback keyboard implementing a piezoelectric element in a downward warped position according to an embodiment of the present disclosure. As described herein, a haptic feedback control signal may be transmitted from the controller to the piezoelectric element to a piezoelectric element of a haptic keyboard to cause a haptic sound. For example, the controller (not shown) in an embodiment may send a haptic feedback control signal or a piezo audio signal to the piezoelectric element 320 according to various embodiments via the metal traces formed on the contact foil 310, through the soldering points 335 and 340 and to a conductive layer of metallic plate or ring 325 formed below the piezoelectric disk material 322.

The conductive layer of metallic plate or ring 325 may apply the haptic feedback control signal a piezo audio signal to the piezoelectric disk material 322 so as to cause the piezoelectric disk material 322 to stretch or shrink depending on the polarity of the signal applied. For example, a negative voltage haptic feedback control signal applied to piezoelectric disk material element 322 at soldering point 335 relative to a positive voltage haptic feedback control signal applied at soldering point 340 as shown in FIG. 3A may cause the piezoelectric disk 322 to compress or shrink in embodiments herein. This may, in turn cause the metallic layer or disk 325 adhered to the ceramic piezoelectric disk 322 to warp downward. Further in the example shown in FIG. 3B, a positive voltage haptic feedback control signal applied to piezoelectric disk material element 322 at soldering point 335 relative to a negative voltage haptic feedback control signal applied at soldering point 340 may cause piezoelectric disk 322 to expand or stretch in embodiments herein. This may, in turn, cause the metallic layer or disk 325 adhered to the ceramic piezoelectric disk 322 to warp upward. The principle of haptics applied to the piezoelectric disk 322 includes an input voltage that is applied through the two electrodes (voltage change as sine wave, square wave etc.) to generate movement on piezoelectric material 322 of the piezoelectric element 320 and a warping of the metallic layer or disk 325. The haptic feedback control signal in an embodiment may comprise a haptic sound feedback control signal for causing haptic sound feedback at the piezoelectric element 322 through one or more frequencies of upward and downward movement.

The haptic sound feedback control signal may be used to cause a haptic sound feedback such as a tone. The piezo audio signal may be used to cause a mid frequency and high frequency sound for audio playback. For example, movement of the piezoelectric element 320 from a planar or neutral position to oscillating upward or downward positions, or between an upward warped position and downward warped position may generate audible sound waves. The pitch and volume of such sound waves in an embodiment may depend, at least partially, on various adjustable aspects (e.g., frequency, magnitude, polarity of voltage) of the haptic feedback control signal or piezo audio signal. Such a haptic sound feedback control signal, such as a sine wave signal, or other haptic feedback control signals with varying polarities or voltage and current may be used by the piezo sound controller to create the haptic sound feedback or mid frequency and high frequency audio heard by the user as described herein.

Figure 3B:
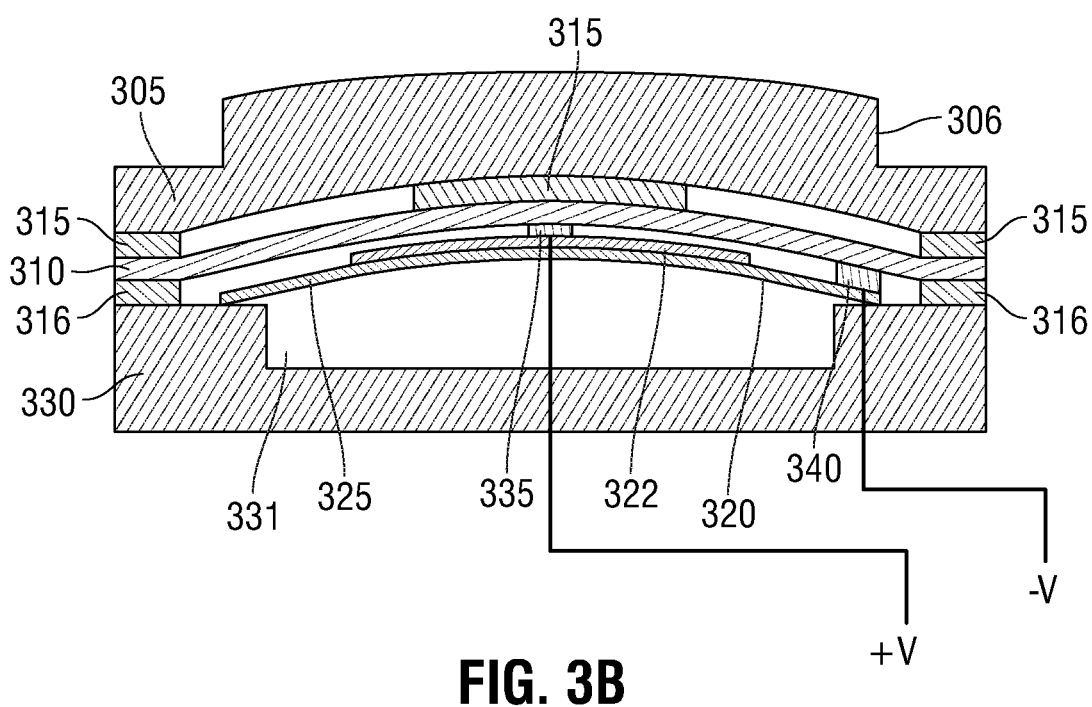
FIG. 3B is a side cut-out view of a key of a keyboard implementing a piezoelectric element in an upward warped position according to an embodiment of the present disclosure.

FIG. 3B is a side cut-out view of a key 300 of a haptic feedback keyboard implementing a piezoelectric element in an upward warped position according to an embodiment of the present disclosure. As described herein, upon receiving a high-frequency audio signal or a mid-frequency audio signal, the controller (not shown) in an embodiment may send these piezo audio signals (e.g., high-frequency audio signals or mid-frequency audio signals) or a haptic sound feedback control signal to the piezoelectric element 320 via the metal traces formed on the contact foil 310, through the soldering points 335 and 340 and to a conductive layer of metallic plate or ring 325 formed below the piezoelectric disk material 322 to cause audio playback (e.g., audio in accordance with the received high-frequency or mid-frequency audio signals) or a haptic sound feedback (e.g., audible tone generated).

Traditional speakers convert digital electrical signals (e.g., audio signals) to audible sound by applying a current or voltage through a coil wire situated adjacent a permanent magnet. As the polarity, amplitude, and frequency of the current or voltage applied varies, the current or voltage interacts with the permanent magnet to cause the coil wire and an attached sound cone move up and down with respect to the permanent magnet. This movement of the voice cone creates pressure waves in the surrounding air, which user's experience as audible sound. The tone of audible sound produced in such a manner depends upon the polarity, amplitude, and frequency of current or voltage applied according to the audio signal. A similar method may be used to cause the metallic plate or ring 325 of a piezoelectric element 320 to cause pressure waves experienced by a user as audible sound.

An audio controller (not shown) in an embodiment may receive a digital representation of an audio signal. This may take the form of a pulse code modulation of a recorded analog audio signal, for example. Such a pulse code modulation may provide one or more oscillating sound signals (e.g., sine waves) having amplitudes and frequencies that vary over time, as the tone and volume of audible sound generated thereby also varies. In other words, the digital representation of an audio signal may be received at the audio controller in a time domain, where the X-axis of a plot formed based on the pulse code modulated data represents time.

As described herein, such an audio signal may be separated into low-frequency, high-frequency, and mid-frequency audio signals, where different speakers or piezoelectric elements are designated to produce sound in accordance with designated frequency ranges. In other embodiments, some of the piezoelectric elements of the haptic keyboard may cover both mid frequency audio as well as high frequency audio in embodiments herein via a combined mid and high piezo audio signal in some embodiments. In order to achieve this, the audio controller in an embodiment may transform the digital pulse code modulated sound data in a received audio signal from the time domain to the frequency domain. In such a way, the audio controller may identify portions of the digital audio signal falling into each of several frequency domains as partitioned by filtering. For example, upon transforming the digital pulse code modulated sound data to the frequency domain, the audio controller in an embodiment may pass the frequency-domain data through a low-pass band filter to isolate portions of the audio signal having a frequency below a low frequency band cutoff (e.g. 500 Hz+/−200 Hz), to produce a low-frequency audio signal. Upon such a filtering, the audio controller may transform the frequency-domain low-frequency audio signal back into a time-domain representation that may be applied to a traditional speaker for low frequency audio. The audio controller may then transmit the time-domain low-frequency audio signal to a low-frequency speaker of the information handling system. The low-frequency speaker in such an embodiment may then emit low-frequency audible sound (e.g., below 500 Hz) according to the digital pulse code modulated sound data (e.g., audio signal).

As another example, upon transforming the digital pulse code modulated sound data to the frequency domain, the audio controller in an embodiment may pass the remaining frequency-domain data that is not low frequency (e.g., >the low frequency cutoff) to a piezo sound controller for generating sound in mid and high frequency ranges at one or more piezoelectric elements on a haptic keyboard or haptic touchpad in embodiments herein. The audio controller in such an embodiment may then transform the frequency domain high-frequency audio signal, and frequency domain mid-frequency audio signal back into the time domain, to produce a high-frequency audio signal and a mid-frequency audio signal that can be understood by the piezo sound controller in an embodiment. The high-frequency audio signal and mid-frequency audio signal in such an embodiment may define changes in voltage amplitude and frequency over time that may be applied to a piezoelectric element (or a traditional speaker) in order to emit sound in accordance with the digital pulse code modulated sound data (e.g., audio signal).

As another example, upon transforming the digital pulse code modulated sound data to the frequency domain, the audio controller in an embodiment may pass the frequency-domain data through a high-pass band filter to remove portions of the frequency-domain data falling below a certain, preset threshold frequency. More specifically, a first high-pass filter may be set to only pass frequencies above a low frequency band cutoff (e.g. 500 Hz+/−200 Hz), which would include high-frequency audio signals and mid-frequency audio signals. This signal may be further separated through additional filters. For example, the audio controller may apply a second high-pass filter to only pass signals having a frequency above a high frequency band cutoff (e.g. 2,000 Hz+/−600 Hz), to produce a high-frequency audio signal. As another example, the audio controller may apply a low-pass filter or band pass filter to only pass signals at or below a high frequency band cutoff (e.g. 2,000 Hz+/−600 Hz) to produce a mid-frequency audio signal. The audio controller in such an embodiment may then transform the frequency domain high-frequency audio signal, and frequency domain mid-frequency audio signal back into the time domain, to produce a high-frequency audio signal and a mid-frequency audio signal that can be understood by the piezo sound controller in an embodiment. The high-frequency audio signal and mid-frequency audio signal in such an embodiment may define changes in voltage amplitude and frequency over time that may be applied to a piezoelectric element or a traditional speaker in order to emit sound in accordance with the digital pulse code modulated sound data (e.g., audio signal).

Following processing of the original audio signal to separate the signal into the various frequency ranges, and transformation of the signals back into the time domain in such a way, either the high-frequency audio signal or the mid-frequency audio signal in an embodiment may comprise a piezo audio signal that may be applied to a piezoelectric element to cause portions of the piezoelectric element to move at the frequency defined by the piezo audio signal or the haptic sound feedback control signal and create audible sound. The conductive layer of metallic plate or ring 325 may apply the haptic sound feedback control signal to the piezoelectric disk material 322 so as to cause the piezoelectric disk material 322 to stretch or shrink depending on the polarity of the signal applied. For example, a positive voltage haptic sound feedback control signal applied to piezoelectric disk material element 322 at soldering point 335 relative to a negative voltage haptic feedback control signal applied at soldering point 340 may cause piezoelectric disk 322 to contract or shrink in embodiments herein. This may, in turn, cause the metallic layer or disk 325 adhered to the ceramic piezoelectric disk 322 to warp upward. By oscillating the voltage (e.g., reversing polarity) of the haptic sound feedback control signals applied to the soldering points 335 and 340 in such a way, the controller in an embodiment may cause the piezoelectric element 320 to move between its upward warped position and downward warped position at the frequency defined by the haptic sound feedback control signal. Such a movement of the metallic plate or disk 325 in an embodiment may generate high-frequency haptic sound feedback and mid-frequency haptic sound feedback having tones dictated by the voltage magnitude and frequency of the haptic sound feedback control signal or the piezo audio signal (e.g., high-frequency audio signal or mid-frequency audio signal).

Figure 4:
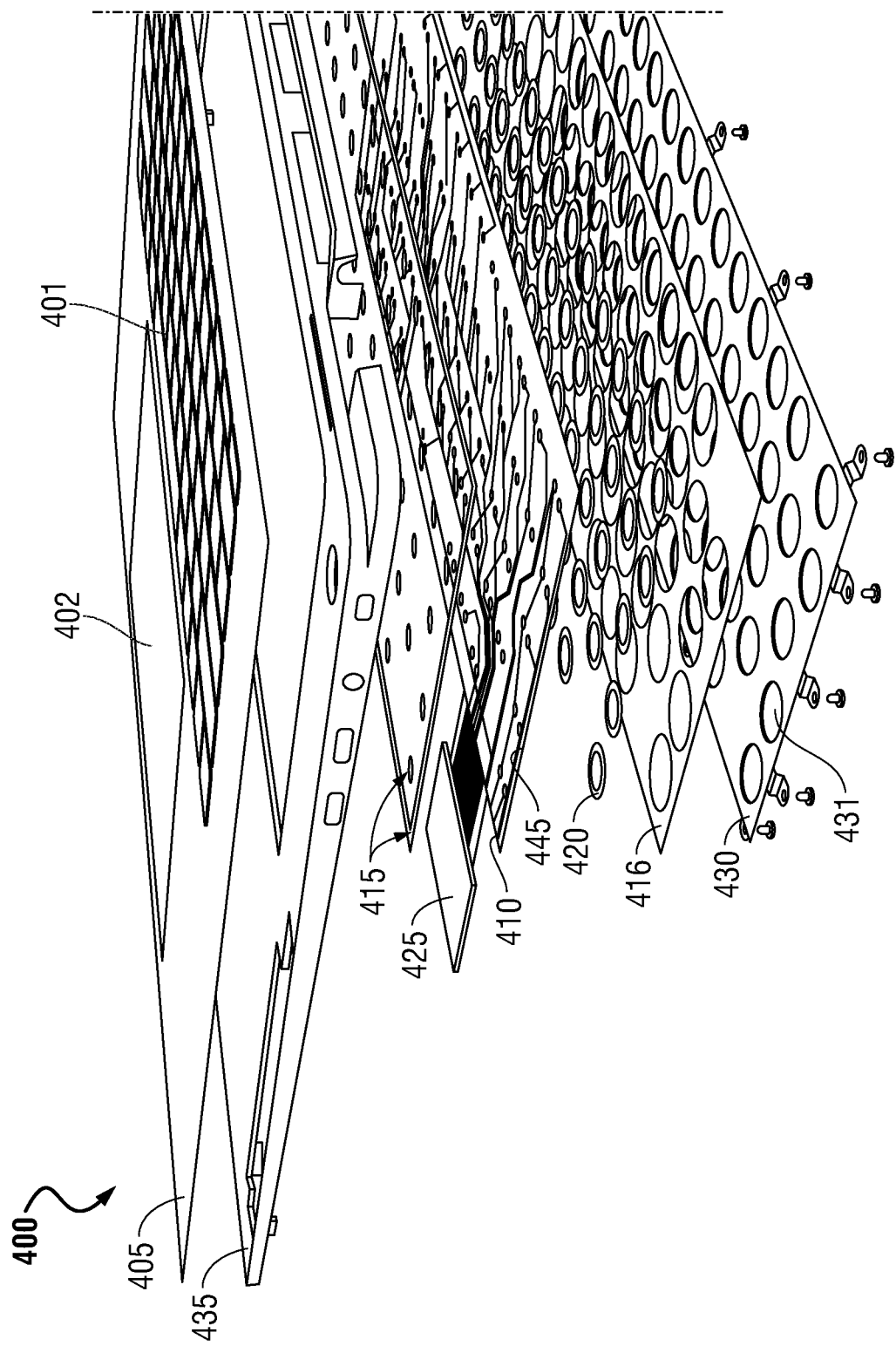
FIG. 4 is an exploded perspective view of a keyboard stack up for of an information handling system according to an embodiment of the present disclosure.

FIG. 4 is an exploded perspective view of a keyboard stack up 400 of an information handling system according to an embodiment of the present disclosure. The keyboard stack up 400 shows a plurality of keys, similar to those described in connection with FIG. 2, arranged so as to receive input from a user at multiple keys. FIG. 4 also shows a top coversheet 405 having both a keyboard 401 and a touchpad 402. Either or both of the keyboard 401 and touchpad 402 may be haptic systems as described in embodiments herein. In an embodiment, the keys may be arranged similar to a QWERTY design of a keyboard 401. However, other arrangements of any alphabetic, numeric, or symbolic keys is contemplated by the present description.

The keyboard stack up 400 may include several layers similar to those described in connection with FIG. 2, 3A, or 3B. In an embodiment, the keyboard stack up 400 includes a coversheet layer 405. The coversheet layer 405 may be made of any type of elastically resilient material. Coversheet layer 405 may include a plurality of key designations, such as key pedestals as shown in keyboard 401 and a touchpad 402 area designation. The elastically resilient material may allow, at least, a portion of the coversheet layer 405 to be deformed upon application of a pressure from a user's finger. Upon withdrawal of the pressure from the user's finger, the material the coversheet layer 405 is made of allows the coversheet layer 405 of the key to bend back to its pre-deformed form.

In an embodiment, in order to shape the coversheet 405, the material used to form the coversheet 405 may be subjected to an injection molding process completed prior to the installation of the coversheet 405 into the remaining layers within the keyboard 400 as described herein. Any number of processes may be included with the injection molding process, including forming a number of holes correlated with a number of keys 401 on the keyboard 400 within a translucent sheet of ABS, and injection molding a translucent ABS through the holes to form a raised portion correlating with each of the number of keys 401 on the keyboard 400. Opposite the raised portions a number of runners may be machined away to accommodate for receipt of other layers of the keyboard such as each of the piezoelectric elements 420.

In other embodiments, the coversheet of the C-cover 435 may include a plurality of vias for keys 401 having a cover sheet 405 or cap for each key 401. A key pedestal for each key 401 in a solid-state keyboard of the present embodiments may be disposed through the vias in the C-cover 435 in such embodiments. Each haptic key of the haptic keyboard in such an embodiment may include a cover layer similar to those described directly above that protrudes through the key vias in the coversheet 405. Layering under the coversheet may include material layers that are hydrophobic or have other properties. Though gaps between haptic keys and key vias may be minimized, such gaps may be useful for audio sound transmission of mid and high frequency sound waves by the piezoelectric elements through the haptic keyboard, for cooling ventilation of the base chassis or for allowing backlighting to frame the haptic keys. Similarly, a touchpad 402 top touch interface layer may be attached under the coversheet 405 to seamlessly provide a designated touchpad area in the C-cover 435 coversheet 405. Any combination of continuous coversheet for haptic keys and vias in the coversheet for placement of haptic keys of a keyboard coversheet layer 405 are contemplated in various embodiments. Further, it is contemplated that in some embodiments one or the other of a haptic keyboard or haptic touchpad may be used with a keyboard 400 having mechanically actuated keys 401 or a touchpad 402 with a mechanically actuated diving board mechanism. Any combination of the above coversheet 405 layouts described is contemplated in embodiments described herein.

The keyboard stack up 400 may further include a C-cover substructure 435 forming part of the base chassis with a cutout for keyboard 401 and touchpad 402. The C-cover substructure 435 may be made of a rigid material that prevents little or no movement. The rigidity of the C-cover substructure 435 allows the other layers within the keyboard 401 to be maintained within the information handling system. In an embodiment, the C-cover substructure 435 may be made of a metal.

The keyboard stack up 400, in an embodiment, may further include any number of adhesive layers 415. In an embodiment, a first adhesive layer 415 may mechanically couple the coversheet layer 405 to a contact foil layer 410. The first adhesive layer 415 may include the placement of the adhesive at locations that may enhance the movement and prevent the hindrance of the actuation of the coversheet layer 405 at those locations across the coversheet layer 405 where keys are present. In a specific embodiment, the first adhesive layer 415 may include placing the adhesive along borders of each of the keys as well as placing the adhesive at a central location of each of the keys.

The contact foil layer 410 may be adhered to the coversheet layer 405 via the first adhesive layer 415 and may be made of any elastically resilient material that, when any given key is actuated or the contact foil layer 410 is bent towards a lower portion of the respective key, returns to its original state when the respective key is no longer being actuated. The contact foil layer 410 may include a number of metal traces 445 formed on at least one surface of the contact foil layer 410 that electrically and communicatively couples each of the keys and a corresponding piezoelectric element 420 to a haptic feedback and piezo sound controller 425 of an information handling system that includes a haptic feedback keyboard control system such as described in connection with FIG. 1. In an embodiment, the haptic feedback and piezo sound controller 425 may be a dedicated controller communicatively coupled to the contact foil layer 410 so as to provide haptic feedback control signals (e.g., haptic sound feedback control signals or haptic sound feedback control signals) or provide piezo audio signals (e.g., high-frequency audio signals, mid-frequency audio signals) back to the respective piezoelectric elements 420. In an alternative embodiment, the haptic feedback and piezo sound controller 425 may be a processor of the information handling system that, among other computations and execution of other computer readable program code, also executes computer readable program code associated with the haptic feedback keyboard control system as described in FIG. 1.

The metal traces 445 formed on the contact foil layer 410 may be used to conduct a haptic feedback control signal or piezo audio signal from the controller 425 to the piezoelectric elements 420. Varying polarities, voltages, or currents of the haptic feedback control signal may cause the piezoelectric elements 420 to stretch or contract in response. For example, as described herein, the controller 425 may apply an oscillating voltage piezo audio signal or haptic feedback control signal that causes one or of the piezoelectric elements 420 to move between its upward warped and downward warped positions to generate an audible sound. The magnitude and frequency of oscillation of the voltage supplied in the form of the piezo audio signal by the controller 425 in an embodiment may be set according to a received high-frequency audio signal or mid-frequency audio signal in an embodiment. The haptic feedback and piezo sound controller 425 may pass the received high-frequency audio signal or mid-frequency audio signal directly to one or more piezoelectric elements 420 as the piezo audio signal in some embodiments.

The keyboard stack up 400 may further include a second adhesive layer 416 that mechanically couples the contact foil layer 410 to a support plate 430. In an embodiment, the second adhesive layer 416 may include the placement of an adhesive along borders of each piezoelectric element 420 of the keyboard stack up 400. As shown in FIG. 4, the second adhesive layer 416 includes circular voids that conform to a shape of each piezoelectric element 420 within the keyboard stack up 400.

The support plate 430 may be made of rigid material such as a metal. The support plate 430 prevents deformation of the keyboard stack up 400 except for, in some embodiments, the contact foil layer 410, piezoelectric element 420, first adhesive layer 415, and second adhesive layer 416 as for operation of the haptic keys. As such, the contact foil layer 410 may be allowed to detect the deformation of the piezoelectric elements 420. Additionally, a user using the keyboard 401 may feel a level of rigidity in the keyboard 401 except that at the locations of the keys where the user has expected that some level of deformation occurs when pressure is applied to provide for key actuation of the piezoelectric element 420.

In an embodiment, the support plate 430 may include a number of cavities 431 formed therein. The cavities 431 may be sized to have a relatively smaller diameter than the diameter of each of the respective piezoelectric elements 420. By including these cavities 431, the piezoelectric elements 420 may be allowed to deform into the cavities 431 so that the deformation of the piezoelectric element 420 creates the electrical charge (e.g., piezo actuation signal) described herein. The metal plate of the piezoelectric elements 420 may have a diameter greater than cavities 431.

Upon compression or contraction of the piezoelectric material portions, such as a ceramic disk of the piezoelectric element 420, the metal plate may warp into (downward) or away from (upward) the cavity 431. The depth of the cavities 431 may also be selected to allow for at least a central portion of each piezoelectric element 420 to be deflected into the cavities 431 some distance. This distance of deflection, in an embodiment, may be 0.1 mm or smaller or may be greater. In an embodiment, the cavities 431 may also be holes punched or machined through the support plate 430.

In an embodiment, the support plate 430 may be secured to other rigid elements of the information handling system. In an embodiment, the support plate 430 may be secured to the C-cover substrate 435 via a number of bolts, screws, or other mechanical or chemical coupling device. In some embodiments, the support plate 430 may be operatively coupled to the D-cover of the information handling system.

Figure 5:
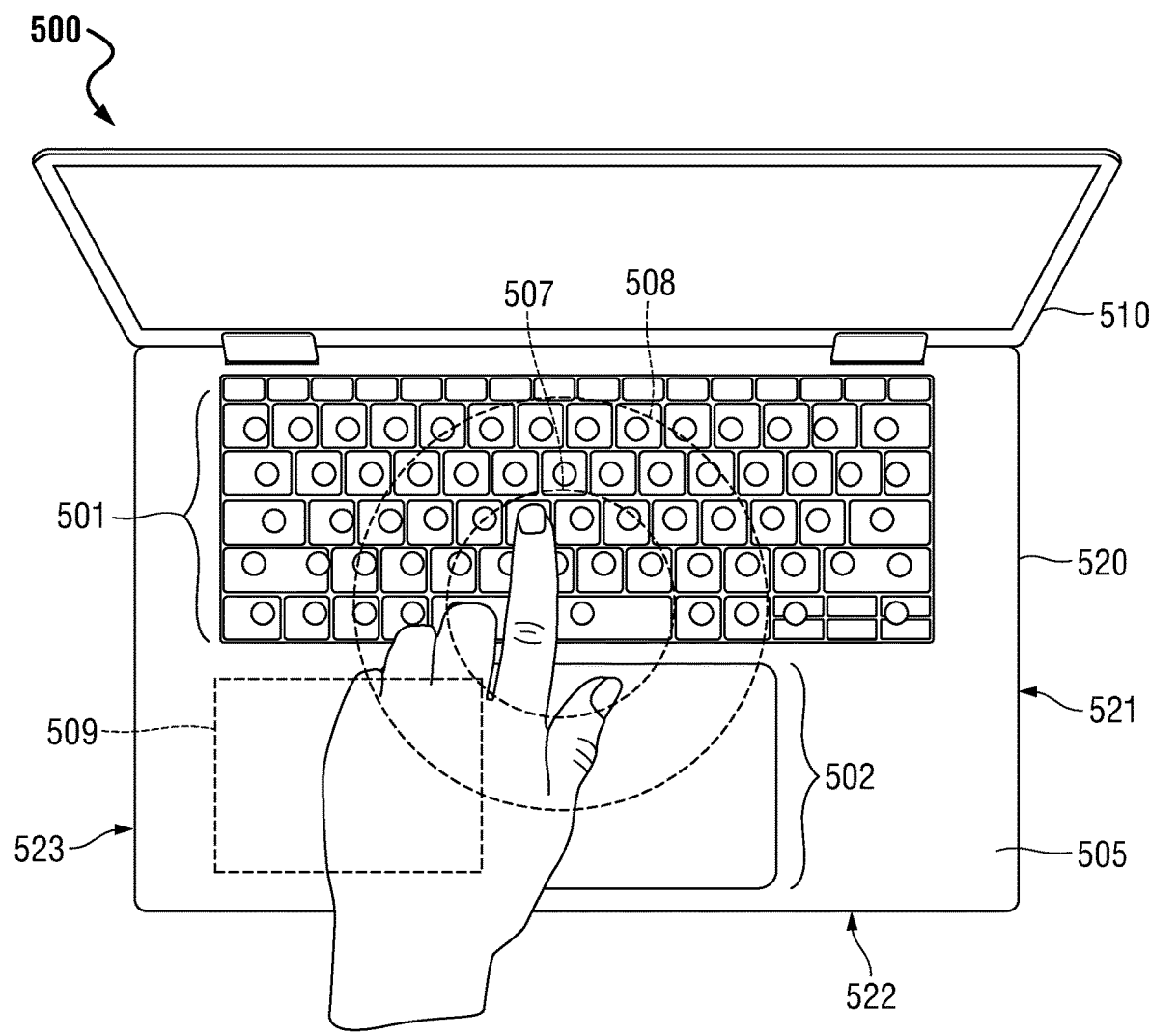
FIG. 5 is a graphical diagram view of an information handling systems including piezoelectric elements capable of generating sound within specific regions of a keyboard or touchpad according to an embodiment of the present disclosure.

FIG. 5 is a graphical diagram illustrating piezoelectric elements of a haptic keyboard capable of generating sound within specific regions of the keyboard pursuant to high-frequency and mid-frequency audio signals received from an audio controller according to an embodiment of the present disclosure. FIG. 5 shows an information handling system 500 implementing a haptic keyboard area 501 and a haptic touchpad area 502 of a coversheet for a base chassis 520 of the information handling system according to embodiments herein. Information handling system 500 includes the base chassis 520 which may house the haptic keyboard 501 and the haptic touchpad 502 including the stack up layers of each as described in embodiments herein. Further, the C-cover of the base chassis 520 may include the coversheet 505 that operates to provide user interface locations for keys of haptic keyboard 501 and for a touchpad interface area for haptic touchpad 502. The base chassis 520 may further house components of the information handling system including processor, graphics processor, motherboard, graphics board, bus systems, power and battery systems, wireless systems, thermal controls, data and power ports, and other components in accordance with the description of FIG. 1. Those components may be installed according to techniques understood by those of skill. Further, base chassis 520 may be hinged to a display chassis 510 for housing a display device and other components according to embodiments herein.

The information handling system 500 implementing a haptic keyboard area 501 and a haptic touchpad area 502 in other embodiments may be comprised of a base chassis 520 that is detachable from the display chassis 510. In still other embodiments, the information handling system 500 implementing the haptic keyboard area 501 and haptic touchpad area 502 may comprise a peripheral device for use with a laptop or desktop computer, such as, for example, a peripheral keyboard, peripheral gaming controller, or peripheral smart device. An information handling system 500 in each of these contemplated embodiments may include a chassis housing the haptic keyboard 501 or the haptic touchpad 502 including the stack up layers of each as described in embodiments herein, as well as the coversheet 505 that operates to provide user interface locations for keys of haptic keyboard 501 or for a touchpad interface area for haptic touchpad 502.

As described herein, a separate piezo element may be situated directly beneath each key cap within the cover sheet in some embodiments. In other embodiments, a plurality of piezo elements may be distributed horizontally across a layer disposed beneath the cover sheet, but the placement of each of the plurality of piezo elements may not directly correspond to the location of individual keys within the cover sheet. The piezo elements of the keyboard 501 or touchpad 502 may be used to generate haptic tactile movement feedback or haptic sound feedback in response to key actuation according to embodiments described herein. In some embodiments, groups or regions of keys of the keyboard 501 or the touchpad 502 may generate audio sound, as instructed by a piezo sound controller via piezo audio signals, in response to high-frequency and mid-frequency audio signals received from an audio controller. In another aspect of an embodiment, the controller may cause piezoelectric elements situated beneath the palm rest 509 of the C-cover 505, or other areas of the C-cover 505 outside the keyboard 501 and touchpad 502 to provide such audio sound or even haptic sound feedback. For example, in an embodiment in which the keyboard controller detects the user currently typing, or detects an actuation of a key or the touchpad 501 within a preset period of time, the haptic feedback and piezo sound controller may transmit a piezo audio signal or a haptic sound feedback control signal to a piezoelectric element situated within region 509, beneath the palm rest of the C-cover 505. One or more piezoelectric elements within region 509 may then produce the audio playback associated with receipt of the high-frequency or mid-frequency audio signals in one example embodiment. In such a way, the haptic feedback and piezo sound controller may use piezoelectric elements situated outside the keyboard 501 and touchpad 502 to produce audio playback sounds, without altering the haptic movement feedback and haptic sound feedback from the piezoelectric elements situated beneath the multiple keys of the keyboard 501 or touchpad 502 the user experiences while typing.

In some embodiments, audio signals may be set to be played through one or more of the piezoelectric elements of the haptic keyboard 501, touchpad 502, or areas of the C-cover 505 situated outside the keyboard 501 and touchpad 502 in tandem with the information handling system speaker system. For example, an audio controller (not shown) in an embodiment may receive a digital representation of an audio signal that plots a plurality of current or voltage amplitudes over time. As described herein, such an audio signal may be separated into low-frequency or high-frequency and mid-frequency audio signals (which may in turn remain combined or be separated in various embodiments), where different speakers or piezoelectric elements are designated to produce sound in accordance with designated frequency ranges. In order to achieve this, the audio controller in an embodiment may transform the digital pulse code modulated sound data in a received audio signal from the time domain to the frequency domain. In such a way, the audio controller may identify portions of the digital audio signal falling into each of several frequency domains. Each of the identified frequency domain signals may be designated for corresponding speaker or piezoelectric elements. For example, audio signals in the low frequency domain may be designated to a low frequency speaker system in the base chassis such as at locations 521, 522, and 523. In one embodiment, mid and high frequency signals may be designated to the piezo electric elements of a haptic keyboard 501 or haptic touchpad 502 or other locations such as 509. For example, upon transforming the digital pulse code modulated sound data to the frequency domain, the audio controller in an embodiment may pass the frequency-domain data through a low-pass band filter to isolate portions of the audio signal having a frequency below a low frequency band cutoff (e.g. 500 Hz+/−200 Hz), to produce a low-frequency audio signal. Upon such a filtering, the audio controller may transform the frequency-domain low-frequency audio signal back into a time-domain representation that may be applied to a traditional low frequency speaker in one embodiment. In some embodiments, upon such a filtering, the audio controller may transform the frequency-domain remaining mid and high-frequency audio signal back into a time-domain representation that may be applied to the piezoelectric elements in an embodiment.

The audio controller may then transmit the time-domain low-frequency audio signal to a low-frequency speaker of the information handling system, which may be coupled within the C-cover 505. The low-frequency speaker in such an embodiment may then emit low-frequency audible sound (e.g., below 500 Hz) according to the digital pulse code modulated sound data (e.g., audio signal). The entirety of the low volume speaker volume may be used to produce the low frequency audio (e.g., base) rather than requiring some volume for mid or high frequency audio according to embodiments herein. In traditional laptop configurations, a single speaker would be used to play the full range of frequencies, and would thus have to be placed within the C-cover 505 at a location that is optimized for delivery of high-frequency sound. Such high-frequency sound is very sensitive to directionality of the sound emitted. In other words, in order to optimize a user's experience of high-frequency sound, the speaker emitting the high-frequency sound must be placed within a very narrow cone of space surrounding the user. Thus, a speaker in a traditional laptop system that emits the full spectrum of sound frequencies for a given audio signal must be situated within the narrow cone with respect to the user. As a consequence, there are very few options for the location of such a traditional laptop speaker within the base chassis 520 of the laptop that includes the C-cover 505. These locations tend to cluster around the keyboard 501 and touchpad 502, because each of the top surfaces of these components tend to face the user during operation of the information handling system.

In contrast, low-frequency sound is far less sensitive to directionality concerns. Thus, there are more available options for locations of a low-frequency speaker that emits only low-frequency sounds of a given audio signal within the base chassis 520 of the information handling system. By separating the low-frequency audio signals from the high-frequency and mid-frequency audio signals, embodiments of the present disclosure allow for placement of low-frequency speakers in locations previously unavailable for disposition of traditional speakers emitting sound in the full spectrum of frequencies. For example, the low-frequency speaker in an embodiment may be situated such that the axis of its port lies parallel to the C-cover 520, and points outward from the interior of the base chassis 520 toward a right-vertical edge 521 of the C-Cover 505, a front-vertical edge 522 of the C-Cover 505, a left-vertical edge 523 of the C-Cover 505, or a rear-vertical edge of the C-cover 505 (not shown, but situated beneath the digital display 510). This may allow for more optimal configuration of all other components within the base chassis of the information handling system.

Embodiments of the present disclosure leverage the fact that the keyboard 501 and touchpad 502 are located at a zone of optimal placement for high-frequency and mid-frequency speakers by employing the piezoelectric elements situated beneath these components as high-frequency and mid-frequency speakers which are place facing a user in many embodiments of information handling systems such as laptop systems. It may be determined in an embodiment, prior to fixing the C-cover 505 to the D-cover (not shown) to enclose the base chassis 520 of the information handling system, that a specific group of piezoelectric elements situated beneath the keyboard 501, touchpad 502, or portions of the C-cover 505 are optimally located for the emission of mid-frequency or high-frequency sound. For example, it may be determined that piezoelectric elements situated within region 507 or within region 508 are optimally located for emission of mid or high frequency sound. In other embodiments, the region of optimal placement of mid or high-frequency speakers may include portions of the C-cover surrounding the keyboard 501 and the touchpad 502.

The audio controller in an embodiment may send piezo audio signals for the mid and high frequency audio to the piezoelectric elements such as those that may be designated as useful or optimal to play sound at such frequency ranges. The high-frequency audio signal and mid-frequency audio signal in such an embodiment may define voltage amplitudes (magnitudes) to be applied over time to a piezoelectric element in order to emit audio playback sound or even haptic sound feedback in accordance with the digital pulse code modulated sound data (e.g., audio signal) within either the high-frequency (or high-frequency haptic sound feedback) and a mid-frequency range (or mid-frequency haptic sound feedback). The audio controller may transmit the high-frequency audio signal and the mid-frequency audio signal to a haptic feedback and piezo sound controller in an embodiment. The haptic feedback and piezo sound controller in such an embodiment may apply the voltages at the magnitudes as a piezo audio signal the piezoelectric elements of the haptic keyboard 501, haptic touchpad 502 or other zone such as 509 with piezoelectric elements to produce the mid and high-frequency haptic sound of audio playback according to the received mid and high-frequency audio signals.

In addition, some other embodiments of the present disclosure further leverage the fact that the keyboard 501 and touchpad 502 are located within the narrow zone of optimal placement for high-frequency and mid-frequency speakers by employing the piezoelectric elements situated beneath these components as separate high-frequency speakers and mid-frequency speakers. It may be determined in an embodiment, prior to fixing the C-cover 505 to the D-cover (not shown) to enclose the base chassis 520 of the information handling system, that a specific group of piezoelectric elements situated beneath the keyboard 501, touchpad 502, or portions of the C-cover 505 are optimally located for emission of high-frequency sound. For example, it may be determined that piezoelectric elements situated within region 507 are optimally located for emission of high-frequency sound. As another example, it may be determined that piezoelectric elements situated within region 508 are optimally located for emission of high-frequency sound. As yet another example, it may be determined that piezoelectric elements situated within region 507 are optimally located for emission of high-frequency sound, but that piezoelectric elements situated within region 508 may also be used for emission of high-frequency sound, should all piezoelectric elements situated within region 507 be in use for a different purpose (e.g., typing). In other embodiments, the region of optimal placement of high-frequency speakers may include portions of the C-cover surrounding the keyboard 501 and the touchpad 502. The piezoelectric elements not identified as optimal for emission of high-frequency sound in an embodiment may be identified for use as potential mid-frequency audio speakers.

Upon identification of each of these optimal high-frequency speaker locations, each of the piezoelectric elements falling within these identified regions may be associated in memory with either high-frequency audio or mid-frequency audio. For example, in an embodiment in which region 507 describes optimal placement of high-frequency speakers, the piezoelectric elements situated beneath the keyboard 501, or touchpad 502 within region 507 may be associated in memory with high-frequency audio. As another example, in an embodiment in which region 508 describes optimal placement of high-frequency speakers, the piezoelectric elements situated beneath the keyboard 501, touchpad 502, or portions of the C-cover 505 outside the keyboard 501 and touchpad 502, but within region 508, may be associated in memory with high-frequency audio. All piezoelectric elements not falling within regions 507 or 508 in such embodiments may then be associated in memory with mid-frequency audio.

The audio controller in an embodiment may parse a received audio signal into separate signals for specific frequency ranges. For example, the audio controller may apply multiple band-pass filters to a frequency domain transform of a received audio signal in order to produce a high-frequency audio signal including tones to be played at frequencies exceeding a high frequency band cutoff (e.g. 2,000 Hz+/−600 Hz), and to produce a mid-frequency audio signal including tones to be played at frequencies between a low frequency band cutoff (e.g. 500 Hz+/−200 Hz) and a high frequency band cutoff (e.g. 2,000 Hz+/−600 Hz). The high-frequency audio signal and mid-frequency audio signal in such an embodiment may define voltage amplitudes (magnitudes) to be applied over time to a piezoelectric element in order to emit audio playback sound or even haptic sound feedback in accordance with the digital pulse code modulated sound data (e.g., audio signal) within either a high-frequency (high-frequency haptic sound feedback) or a mid-frequency range (mid-frequency haptic sound feedback). The audio controller may transmit the high-frequency audio signal and the mid-frequency audio signal to a haptic feedback and piezo sound controller in an embodiment. The haptic feedback and piezo sound controller in such an embodiment may apply the voltages at the magnitudes given in the high-frequency audio signal to the piezoelectric elements situated within the region (e.g., 507 or 508) associated with high-frequency audio, to cause those piezoelectric elements to produce a high-frequency haptic sound feedback according to the received high-frequency audio signal. Similarly, the haptic feedback and piezo sound controller in such an embodiment may also apply the voltages at the magnitudes given in the mid-frequency audio signal to the piezoelectric elements situated outside the region (e.g., 507 or 508) associated with high-frequency audio signals, or to piezoelectric elements associated in memory with mid-frequency audio, to cause the piezoelectric elements associated with mid-frequency audio to produce mid-frequency haptic sound feedback in the mid-frequency range according to the received mid-frequency audio signal.

Figure 6:
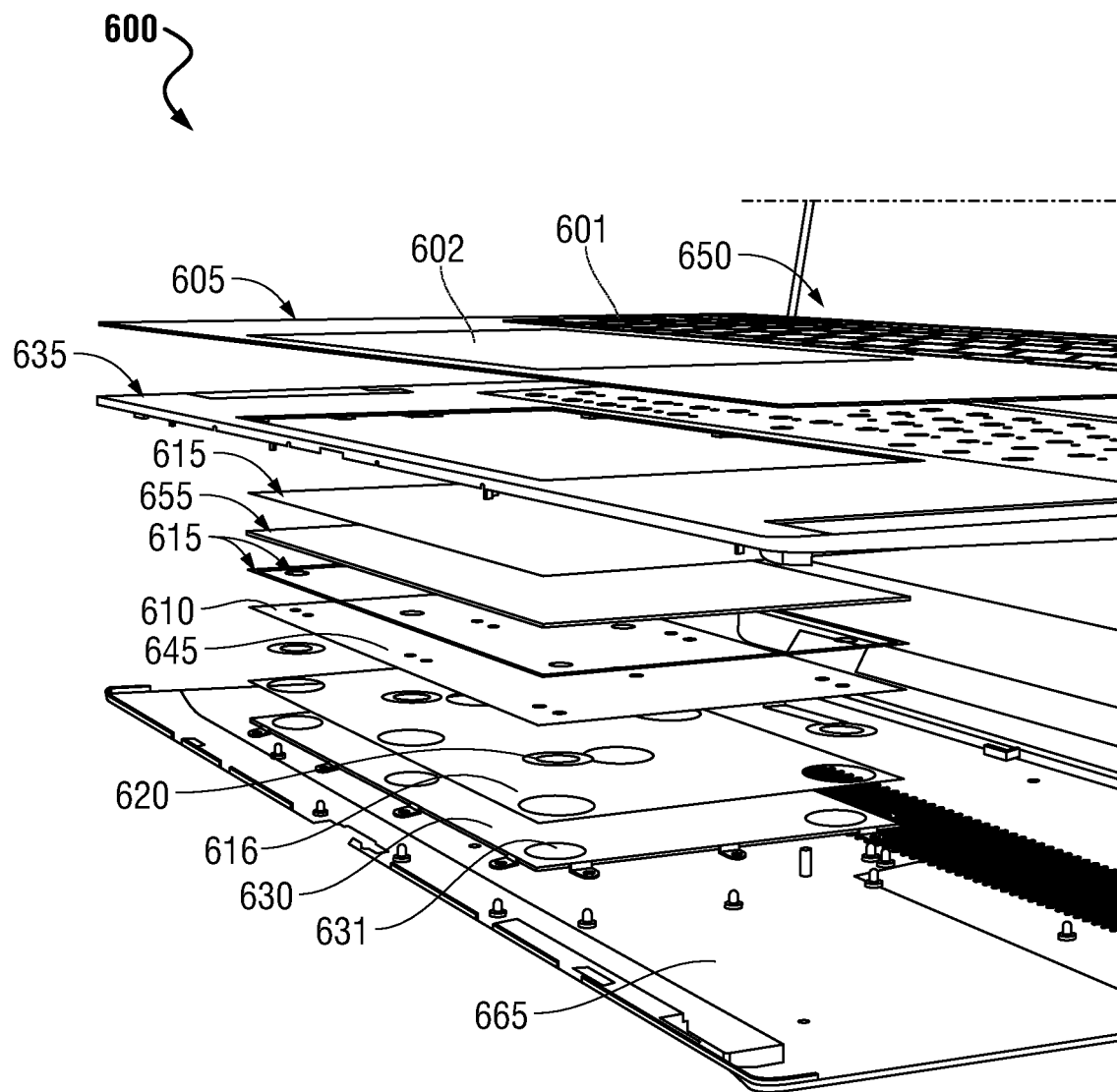
FIG. 6 is an exploded perspective view of a touchpad stack up of an information handling system according to another embodiment of the present disclosure.

FIG. 6 is an exploded perspective view of a touchpad stack up 600 of an information handling system according to another embodiment of the present disclosure. The touchpad stack up 600 may also have a touchpad that implements the piezoelectric elements 620 described herein. The touchpad may be formed, in some embodiments, into a touchpad cover area 602 in coversheet layer 605. Coversheet 605 may also have a number of keys of a keyboard 601. Coversheet 605 may have one or both the haptic touchpad 602 and haptic keyboard 601 in some embodiments. In other embodiments, either the haptic touchpad 602 or keyboard 601 may be a conventional system. For example, a mechanical keyboard 601 may be implemented with a haptic touchpad 602. In another embodiment, the touchpad coversheet layer 605 may be separate from any other coversheet layer such as for the keyboard 601 or other portions of a C-cover.

The touchpad coversheet layer 605 with designated haptic touchpad 602 may be made of any type of elastically resilient material. The elastically resilient material may allow, at least, a portion of the touchpad coversheet layer 605 to be deformed upon application of a pressure from a user's finger. Upon withdraw of the pressure from the user's finger, the material of the touchpad coversheet layer 605 is made of allows the touchpad coversheet layer 605 of the touchpad to bend back to its pre-deformed state. In an embodiment, the resilient material may allow the touchpad coversheet layer 605 at haptic touchpad 602 to travel a distance of between 0.01 mm and 2 mm.

The arrangement of the piezoelectric elements 620 for haptic touchpad 602 described herein is also shown in FIG. 6. In the embodiment shown in FIG. 6, piezoelectric elements 620 are placed in an array under the touchpad of the touchpad coversheet layer 605. The placement of the piezoelectric elements 620 in the array under the touchpad surface 602 of the touchpad coversheet layer 605 may include more or less than the number of piezoelectric elements 620 shown. As described herein, the operation of the touchpad may be dependent on the location and number of piezoelectric elements 620. During operation, a controller (not shown) similar to the controller described in connection with FIG. 4 may receive an electric charge from one or a plurality of piezoelectric elements 620 formed below and across the touchpad area 620 of coversheet layer 605 so that the controller may detect one or more piezoelectric elements 620 providing a signal depending on proximity underneath an x- and y-coordinate location of the actuation location on the touchpad by the user. The receipt of one or a plurality of electrical charges from these piezoelectric elements 620 may allow the controller to appropriately send a haptic feedback control signal to any of the piezoelectric elements 620 so that the user may detect a haptic tactile feedback at the location where the user has actuated the haptic touchpad 602 of the coversheet layer 605. The haptic feedback control signal in an embodiment may also cause the piezoelectric elements 620 situated beneath the haptic touchpad 602 to generate haptic sound feedback. In yet other embodiments, piezo audio signals may cause piezoelectric elements 620 situated beneath the haptic touchpad 602 to generate audio playback sounds (e.g., in mid or high frequency ranges).

The coversheet 605 with haptic touchpad 602 may further include a C-cover substructure 635. The C-cover substructure 635 may be made of a rigid material that prevents little or no movement. The rigidity of the C-cover substructure 635 allows the other layers within the touchpad stack up 600 to be maintained within the information handling system. In an embodiment, the C-cover substructure 635 may be made of a metal.

The touchpad stack up 600, in an embodiment, may further include any number of adhesive layers 615. In an embodiment, a first adhesive layer 615 may mechanically couple the touchpad coversheet layer 605 to a capacitive touch layer 655. The capacitive touch layer 655 may be made of a rigid material such as a glass, biaxially-oriented polyethylene terephthalate (BoPET) such as Mylar® produced by DUPONT®, or a glass-reinforced epoxy such as FR4 to serve a purpose as a stiffening layer as well. The capacitive touch layer 655 includes a grid of drive and sense lines to determine x- and y-touch locations on haptic touchpad 602 by a user. The capacitive touch layer 655 may be placed within the layers of the touchpad to distribute forces from a user's finger across the surface of the touchpad coversheet layer 605 and to the nearest or a plurality of nearest piezoelectric elements 620 in the array formed below and across the bottom surface of the haptic touchpad 602 of the coversheet layer 605 and capacitive touch layer 655. The stiffening function of the capacitive touch stiffening layer 655 is an optional embodiment as a rigidity of the haptic touchpad 602 may be provided by other layers as well in other embodiments.

The first adhesive layer 615 may include the placement of the adhesive at locations that may enhance the movement and prevent the hindrance of the actuation of the touchpad coversheet layer 605 at those locations across the touchpad coversheet layer 605 where piezoelectric elements 620 are present. In a specific embodiment, the first adhesive layer 615 may include placing the adhesive along borders of each of the piezoelectric elements 620 as well as placing the adhesive at a central location of each of the piezoelectric elements 620.

The contact foil layer 610 adhered to the touchpad coversheet layer 605 via the first adhesive layer 615 may be made of any elastically resilient material that, when any given location at the touchpad coversheet layer 605 is actuated or the contact foil layer 610 is bent towards a lower portion of the respective location, returns to its original state when the respective location is no longer being actuated.

In an embodiment, the contact foil layer 610 or the capacitive touch layer 655 may include a capacitive touch layer x and y grid that detects and measures anything that is conductive such as a user's finger. The drive lines and sense lines may be a grid of indium tin oxide (ITO) or other conductive materials arranged to detect capacitive changes at x and y locations across the capacitive touch layer that correspond to the touch interface cover layer of the haptic touchpad 602. The capacitive touch layer 655 may be a printed circuit board (PCB) layer for the detection of the user's finger at an x- and y-coordinate location across the surface of the area of the haptic touchpad 602 of the coversheet layer 605. The capacitive touch layer 655 may be an array of drive lines and sense lines of ITO formed on the capacitive touch stiffening layer 655 or on the contact foil 610 in an embodiment. Drive lines and sense lines may be operatively coupled to a capacitive touch controller for determining x- and y-location of touches on the haptic touchpad 602. The capacitive touch layer can be part of the contact foil layer 610, or its own contact touch layer 655, or part of a stiffener layer in various embodiments.

The contact foil layer 610 may include a number of metal traces 645 formed thereon that electrically and communicatively couples each of the locations and corresponding piezoelectric elements 620 to a controller (not shown) of an information handling system that includes a haptic feedback touchpad 602 control system such as described in connection with FIG. 1 to provide haptic tactile feedback, haptic sound feedback, or piezo audio sounds in various embodiments of the present disclosure. Traces may be opposite the capacitive touch layer on contact foil layer 610 in an embodiment. In an embodiment, the controller may be a dedicated controller communicatively coupled to the contact foil layer 610 so as to detect electrical charges from the piezoelectric elements 620 and provide electrical signals back to the respective piezoelectric elements 620. In an alternative embodiment, the controller may be a processor of the information handling system that, among other computations and execution of other computer readable program code, also executes computer readable program code associated with the haptic feedback keyboard control system as described in FIG. 1.

During operation of the touchpad, the contact foil layer 610 may receive an electrical charge from one or a plurality of piezoelectric elements 620 operatively coupled underneath the metal traces 645 that conduct the electrical charge to the controller associated with the keyboard 600. The metal traces 645 formed on the contact foil layer 610 may further be used to conduct a haptic feedback control signal or piezo audio signals from the controller to the piezoelectric elements 620 so that the voltage and current of the return electrical signal may cause the piezoelectric elements 620 to generate haptic feedback or audible sound via or through the touchpad area 602. As described, the haptic feedback control signal or piezo audio signals may be a sine wave, a square wave, a pulsed signal or other variations of voltage or polarity changes to generate a warping of a metal plate to generate audible sound.

The touchpad stack up 600 may further include a second adhesive layer 616 that mechanically couples the contact foil layer 610 to a support plate 630. In an embodiment, the second adhesive layer 616 may include an adhesive that includes the placement of an adhesive along borders of each piezoelectric element 620. As shown in FIG. 6, the second adhesive layer 616 includes circular voids that conform to a shape of each piezoelectric element 620 placed below the touchpad area 602 of the coversheet layer 605.

The support plate 630 may be made of rigid material such as a metal. The support plate 630 prevents deformation of the touchpad stack up 600 except for, in some embodiments, actuation levels of deformation at the contact foil layer 610, piezoelectric elements 620, the first adhesive layer 615, second adhesive layer 616, and other relevant layers as described. As such, the contact foil layer 610 may be allowed to detect the deformation of the piezoelectric elements 620. Additionally, a user using the touchpad stack up 600 may feel a level of rigidity in the area of the haptic touchpad 602 that the user actuates with the piezoelectric elements 620 providing a haptic event to mimic the deformation to occur when pressure is applied.

In an embodiment, the support plate 630 may include a number of cavities 631 formed therein. The cavities 631 may be sized to have a relatively smaller diameter than the diameter of each of the respective piezoelectric elements 620. By including these cavities 631, the piezoelectric elements 620 may be allowed to be deformed into the cavities 631 so that the deformation of the piezoelectric elements 620 creates the electrical charge (e.g., piezo actuation signal) described herein to detect actuation. The depth of the cavities 631 may also be selected to allow for at least a central portion of each piezoelectric elements 620 to be deflected into the cavities 631 some distance. This distance of deflection, in an embodiment, may be 0.1 mm or smaller or greater according to embodiments herein.

In an embodiment, the support plate 630 may be secured to other rigid elements of the information handling system. In an embodiment, the support plate 630 may be secured to the C-cover substructure 635 via a number of bolts, screws, or other mechanical or chemical coupling device. In some embodiments, the support plate 630 may be a part of the D-cover of the information handling system.

Each of the piezoelectric elements 620 may include a layer of piezoelectric material and a conductive metal plate layer as described herein in connection with the larger figures describing the keys in FIGS. 2, 3A and 3B. Additionally, each piezoelectric element 620 of the touchpad stack up 600 may be operatively coupled to at least one metal trace 645 formed on the contact foil layer 610 via a contact point such as a solder point. In this embodiment, the conductive metal plate and the piezoelectric materials of the piezoelectric elements 620 may each be operatively coupled to at least one metal trace 645 formed on the contact foil layer 610 via a contact point such as a solder point. Thus, the contact foil layer 610 may, in an embodiment, include two metal traces 645 for each piezoelectric element 620 formed in the keyboard 600.

The controller may receive one or more audio signals from an audio processor in an embodiment, and send one of these received audio signals back to the piezoelectric material of the piezoelectric element 620 as a piezo audio signal. For example, the controller may receive a high-frequency audio signal or a mid-frequency audio signal from the audio processor. The controller may transmit a piezo audio signal to one or more of the piezoelectric elements 620 to cause them to make audible sound based on the received high-frequency audio signal or mid-frequency audio signal. For example, the piezo audio signal may comprise a only high-frequency audio signal, which the controller may transmit to the piezoelectric element 620 via the contact foil layer 610 in one example variation embodiment. As another example, the piezo audio signal may comprise only a mid-frequency audio signal, which the controller may transmit to the piezoelectric element 620 via the contact foil layer 610 in another example embodiment variation. In some embodiments, the controller may transmit the high-frequency audio signal to one subset of the piezoelectric elements 620, and transmit the mid-frequency audio signal to another subset of the piezoelectric elements 620. In yet another embodiment, the controller may transmit high-frequency audio signal to one or more of the piezoelectric elements situated within the keyboard stack up described with reference to FIG. 4, and transmit the mid-frequency audio signal to one or more of the piezoelectric elements 620 of the touchpad, or vice-versa. In still other embodiments, the high-frequency audio signal or mid-frequency audio signal may also be transmitted to one or more piezoelectric elements situated beneath the C-cover, located outside the keyboard and the touchpad (e.g., palmrest), as described in greater detail with reference to FIG. 5.

This haptic sound feedback control signal or piezo audio signal (e.g., high-frequency audio signal or mid-frequency audio signal) may have a certain voltage, current, and polarity sufficient to cause a stretching or contraction response to generate a haptic sound feedback (e.g., click, buzz, or tone) or audio playback in mid and high frequency ranges as described in various embodiments herein. The electrical signal from the controller may follow the same metal traces 645 back to the given piezoelectric element 620 for haptic sound feedback. The electrical signal may be received at a conductive layer of the piezoelectric element 620 via, for example, the contact points such as the solder points. As a result of the piezoelectric material may be moved between its upward warped and downward warped positions to generate audible sound. Unlike the individual keys of described in connection with the haptic keyboard of FIGS. 3A and 3B, however, the individual piezoelectric elements 620 may cooperate within the array to create the haptic sound feedback heard by the user.

In an embodiment, the keyboard 600 may, once the layers described herein are coupled together, be placed within the C-cover 635 with a D-cover 665 coupled thereto. The assembly of the coversheet 605, C-cover substructure 635, and the D-cover 665 forms a base chassis of the information handling system. In an embodiment, the base chassis may be coupled to a display chassis 650 that may include a display device.

Figure 7:
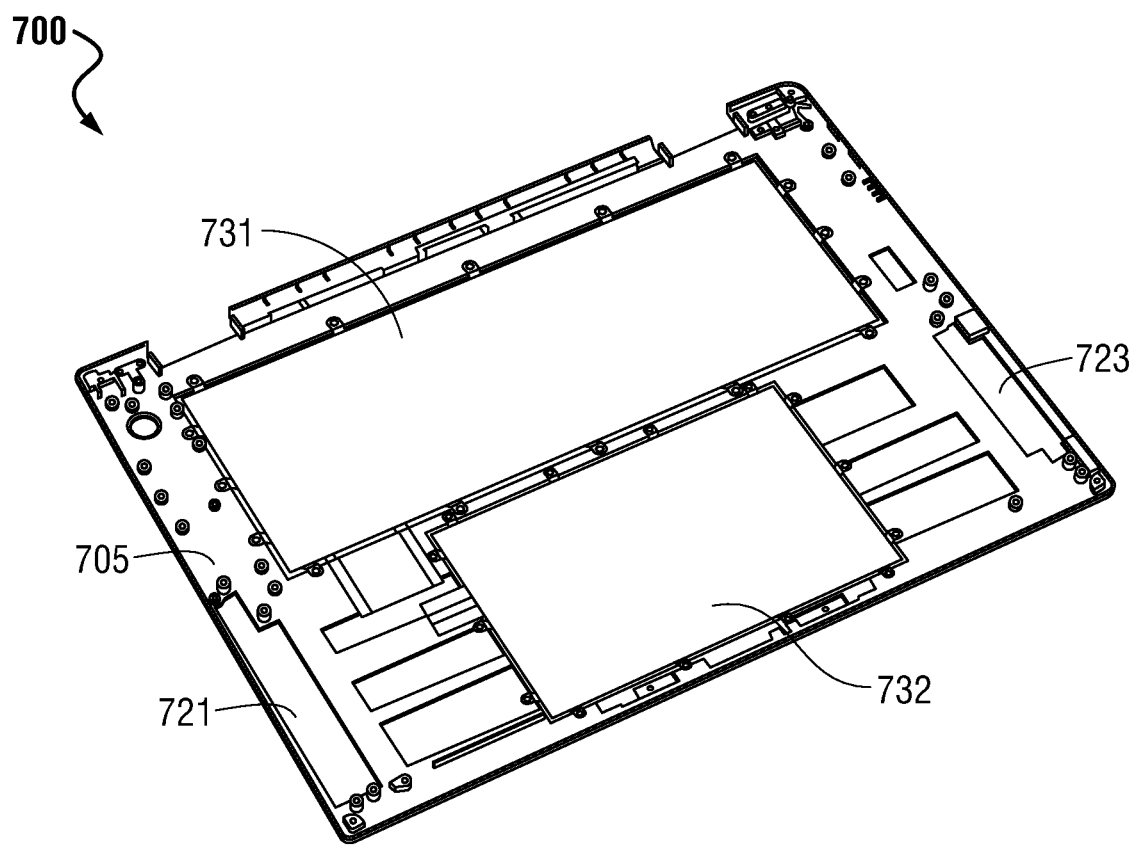
FIG. 7 is back perspective view of a C-cover of an information handling system according to an embodiment of the present disclosure.

FIG. 7 is back perspective view of a C-cover 705 of an information handling system 700 according to an embodiment of the present disclosure. The C-cover 705 may be used to house a keyboard and touchpad as described herein. As also described, each of the keyboard and touchpad may include a support plate 731 and 732, respectively. In an embodiment, a single support plate may be used to support one or more of the keyboard piezoelectric assemblies described in connection with FIG. 4 and the touchpad piezoelectric assembly described in connection with FIG. 6. In an alternative embodiment, the keyboard piezoelectric assemblies and the touchpad piezoelectric assembly may each include their own support plate 731 and 732, respectively. The support plates of the C-cover 705 shown may increase the stiffness of the haptic keyboard and touchpad described herein because the support plates 731 and 732 may be firmly fixed to the C-cover 705. This may enhance the perceived quality of the information handling system while still having a haptic feedback method and system that allows the user to feel as if an actuation of a key or touchpad has occurred. Still further, the haptic feedback systems described herein creates a keyboard or touchpad that feels like a mechanical keyboard vastly reduces physical key travel. Additionally, the construction of the haptic feedback systems described herein results in a much thinner and simpler keyboard and touchpad than that of a mechanical keyboard or touchpad enabling a thinner information handling system in some embodiments. With the reduction in space occupied by the haptic feedback keyboard and touchpad, space within the information handling system base chassis may be increased for use by other, additional, or larger components within the information handling system. In a specific example embodiment, the additional space provided within the information handling system due to the use of a haptic feedback keyboard and touchpad results in the ability to increase the size of a battery used to power the information handling system.

As shown in FIG. 7, the C-cover 705 may include both a piezoelectric keyboard portion secured to the C-cover 705 by a first support plate 731 and a touchpad portion being secured to the C-cover 705 by a second support plate 732. In an embodiment, it is contemplated that the touchpad and keyboard as described herein may be secured to the C-cover 705 by a single support plate that combines 731 and 732. In these embodiments, the keyboard and touchpad may both be operated using the piezoelectric elements as described herein.

FIG. 7 also depicts low frequency speaker boxes 721 and 723 that may be situated in the base chassis in embodiments herein. The low frequency speakers 721 and 723 may be magnetic, traditional speakers contained in a speaker box made of plastic or other material to provide a speaker volume. Speakers 721 and 723 may be situate along any side of C-cover 705 in embodiments such as the sides shown. The speaker box volume of 721 and 723 may extend into the base chassis formed when the D-cover (not shown) is assembled with C-cover 705. The speakers 721 and 723 may transmit low frequency sound via apertures in the sides of the base chassis in some example embodiments.

Figure 8:
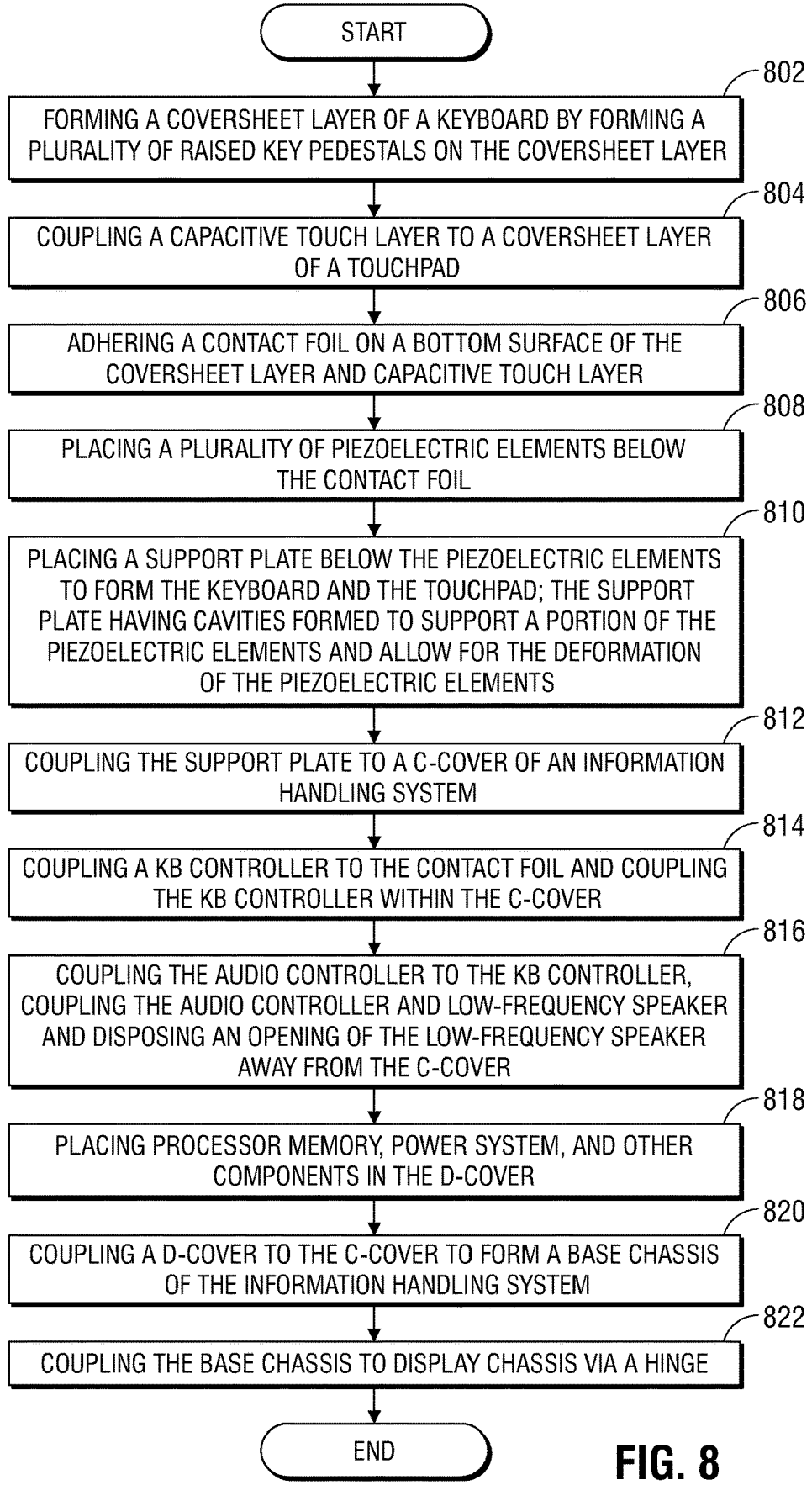
FIG. 8 is a flow diagram illustrating a method of manufacturing a haptic keyboard and touchpad of an information handling system according to an embodiment of the present disclosure.

FIG. 8 is a flow diagram illustrating a method of manufacturing a haptic keyboard and touchpad including piezoelectric elements acting as high-frequency and mid-frequency speakers of an information handling system according to an embodiment of the present disclosure. As described herein, embodiments of the present disclosure may employ piezoelectric elements of a haptic keyboard as high-frequency or mid-frequency audible sound speakers. Such piezoelectric elements may be situated toward the user during use, which may be an optimal location for such high-frequency or mid-frequency audible sound speakers.

At block 802, a coversheet layer of a keyboard may be formed in an embodiment by forming a plurality of raised key pedestals on the coversheet. In an embodiment, the shape of the coversheet layer may be such so as to conform to the user's fingers, and the material used to form the coversheet layer may be subjected to an injection molding process. As such, a top portion of the coversheet layer may be formed to be ergonomically beneficial to a user's actuation such as by providing key pedestals, key frame, or other tactile or visual designation of a key and by conforming to the user's fingers, for example. The injection molding process may be completed prior to the installation of the coversheet layer into the remaining layers within the keyboard as described herein. Any number of processes may be included with the injection molding process. In an embodiment, the injection molding process used to form the coversheet layer may include forming a number of holes within a sheet of, for example, ABS. These holes may correlate with each actuatable key to be formed on the keyboard. The formation of the coversheet layer may continue with injection molding a translucent ABS through the holes to form a raised portion correlating with each of the number of keys on the keyboard. Opposite the raised portions a number of runners may be machined away to accommodate for receipt of other layers of the keyboard such as each of the piezoelectric elements. The surface of the coversheet layer on which the raised portions are formed may be painted and any number or type of graphics may be laser etched or painted on each raised portion or other indicators indicating a specific key of the keyboard.

A capacitive touch layer may be coupled to a coversheet layer of the touchpad in an embodiment at block 804. For example, in an embodiment described with reference to FIG. 6, the capacitive touch layer 655 may be coupled to the coversheet layer 605, and may include a capacitive touch layer x and y grid that detects and measures anything that is conductive such as a user's finger. The drive lines and sense lines may be a grid of indium tin oxide (ITO) or other conductive materials arranged to detect capacitive changes at x and y locations across the capacitive touch layer that correspond to the touch interface cover layer of the haptic touchpad 602. The capacitive touch layer 655 may be a printed circuit board (PCB) layer for the detection of the user's finger at an x- and y-coordinate location across the surface of the area of the haptic touchpad 602 of the coversheet layer 605. The capacitive touch layer 655 may be an array of drive lines and sense lines of ITO formed on the capacitive touch stiffening layer 655 or on the contact foil 610 in an embodiment. Drive lines and sense lines may be operatively coupled to a capacitive touch controller for determining x- and y-location of touches on the haptic touchpad 602. The capacitive touch layer can be part of the contact foil layer 610, or its own contact touch layer 655, or part of a stiffener layer in various embodiments.

At block 806, a contact foil may be adhered on a bottom surface of the coversheet layer and capacitive touch layer. For example, in an embodiment described with reference to FIG. 4, the contact foil layer 410 may be adhered to the coversheet layer 405 via the first adhesive layer 415 and may be made of any elastically resilient material that, when any given key is actuated or the contact foil layer 410 is bent towards a lower portion of the respective key, returns to its original state when the respective key is no longer being actuated. The contact foil layer 410 may include a number of metal traces 445 formed on at least one surface of the contact foil layer 410 that electrically and communicatively couples each of the keys and a corresponding piezoelectric element 420 to a haptic feedback and piezo sound controller 425 of an information handling system that includes a haptic feedback keyboard control system such as described in connection with FIG. 1. The metal traces 445 formed on the contact foil layer 410 may be used to conduct a haptic feedback control signal from the controller 425 to the piezoelectric elements 420. Varying polarities, voltages, or currents of the haptic feedback control signal may cause the piezoelectric elements 420 to stretch or contract in response. The magnitude and frequency of oscillation of the voltage supplied in the form of the haptic feedback control signal by the controller 425 in an embodiment may be set according to a received high-frequency audio signal or mid-frequency audio signal in an embodiment.

As another example, in an embodiment described with reference to FIG. 6, the contact foil layer 610 may be adhered to the touchpad coversheet layer 605 via the first adhesive layer 615. The contact foil layer 610 may include a number of metal traces 645 formed thereon that electrically and communicatively couples each of the locations and corresponding piezoelectric elements 620 to a controller (not shown) of an information handling system that includes a haptic feedback touchpad 602 control system such as described in connection with FIG. 1. Traces may be opposite the capacitive touch layer on contact foil layer 610 in an embodiment. During operation of the touchpad, the contact foil layer 610 may receive an electrical charge from one or a plurality of piezoelectric elements 620 operatively coupled underneath the metal traces 645 that conduct the electrical charge to the controller associated with the keyboard 600. The metal traces 645 formed on the contact foil layer 610 may further be used to conduct a haptic feedback control signal from the controller to the piezoelectric elements 620 so that the voltage and current of the return electrical signal may cause the piezoelectric elements 620 to make an audible sound via or through the touchpad area 602.

In still another embodiment, the contact foil layer 610 may comprise the capacitive touchpad layer 655. The contact foil layer 610 or the capacitive touch layer 655 in such an embodiment may include a capacitive touch layer x and y grid that detects and measures anything that is conductive such as a user's finger. The drive lines and sense lines may be a grid of indium tin oxide (ITO) or other conductive materials arranged to detect capacitive changes at x and y locations across the capacitive touch layer that correspond to the touch interface cover layer of the haptic touchpad 602.

A plurality of piezoelectric elements may be placed below the contact foil in an embodiment at block 808. For example, in an embodiment described with reference to FIG. 4, a plurality of piezoelectric elements 420 may be placed below the contact foil 410 such that downward pressure applied by the user at a piezoelectric element 420 causes deformation of the element 420 within one or more of the cavities 431 within the support plate 430. As another example, in an embodiment described with reference to FIG. 6, piezoelectric elements 620 may be placed in an array under the touchpad of the touchpad coversheet layer 605. During operation, a controller (not shown) may send a haptic feedback control signal in the form of an audio signal to any of the piezoelectric elements 620 so that the haptic touchpad 602 generates audible sound, or haptic sound feedback.

At block 810, a support plate may be placed below the piezoelectric elements to form the keyboard and the touchpad in an embodiment. For example, in an embodiment described with reference to FIG. 4, the support plate 430 may be placed below the piezoelectric elements 420 and may be made of rigid material such as a metal. In an embodiment, the support plate 430 may include a number of cavities 431 formed therein, which may be sized to have a relatively smaller diameter than the diameter of each of the respective piezoelectric elements 420. By including these cavities 431, the piezoelectric elements 420 may be allowed to deform into the cavities 431 so as to generate audible sound according to a received audio signal. Upon compression or contraction of the piezoelectric material portions, such as a ceramic disk of the piezoelectric element 420, the metal plate may warp into (downward) and away from (upward) the cavity 431 to generate such audible sound.

As another example, in an embodiment described with reference to FIG. 6, the support place 630 may be placed below the piezoelectric elements 620 to form the keyboard (not shown) and touchpad 602. The support plate 630 may be made of rigid material such as a metal. The support plate 630 prevents deformation of the touchpad stack up 600 except for, in some embodiments, actuation levels of deformation at the contact foil layer 610, piezoelectric elements 620, the first adhesive layer 615, second adhesive layer 616, and other relevant layers as described.

The support plate may be coupled to a C-cover of an information handling system in an embodiment at block 812. For example, in an embodiment described with reference to FIG. 4, the support plate 430 be secured to the C-cover substrate 435 via a number of bolts, screws, or other mechanical or chemical coupling device. As another example, in an embodiment described with reference to FIG. 6, the support plate 630 may be secured to other rigid elements of the information handling system. For example, the support plate 630 may be secured to the C-cover substructure 635 via a number of bolts, screws, or other mechanical or chemical coupling device. In some embodiments, the support plate 630 may be a part of the D-cover of the information handling system.

At block 814, the controller or other processor may be coupled to the contact foil and coupled within the C-cover in an embodiment. For example, in an embodiment described with reference to FIG. 4, the contact foil layer 410 may include a number of metal traces 445 formed on at least one surface of the contact foil layer 410 that electrically and communicatively couples each of the keys and a corresponding piezoelectric element 420 to a haptic feedback and piezo sound controller 425 of an information handling system that includes a haptic feedback keyboard control system such as described in connection with FIG. 1. In an embodiment, the haptic feedback and piezo sound controller 425 may be a dedicated controller communicatively coupled to the contact foil layer 410 so as to provide haptic feedback control signals (e.g., haptic sound feedback control signals, high-frequency audio signals, mid-frequency audio signals) back to the respective piezoelectric elements 420. In an alternative embodiment, the haptic feedback and piezo sound controller 425 may be a processor of the information handling system that, among other computations and execution of other computer readable program code, also executes computer readable program code associated with the haptic feedback keyboard control system as described in FIG. 1.

As another example, in an embodiment described with reference to FIG. 6, the contact foil layer 610 may include a number of metal traces 645 formed thereon that electrically and communicatively couples each of the locations and corresponding piezoelectric elements 620 to a controller or processor of an information handling system that executes code instructions of a haptic feedback touchpad control system such as described in connection with FIG. 1. In another embodiment, a dedicated controller communicatively coupled to the contact foil layer 610 may execute the code instructions of the haptic feedback touchpad control system so as to detect piezo actuation signals from the piezoelectric elements 620 and provide haptic sound feedback control signals back to the respective piezoelectric elements 620. The voltage and current of the return haptic sound feedback control signal in such an embodiment may cause the piezoelectric elements 620 to make an audible sound via or through the touchpad area 602. As described, the haptic feedback control signal may be a sine wave, a square wave, a pulsed signal or other variations of voltage or polarity changes to generate a warping of a metal plate to generate audible sound.

An audio controller may be coupled to the haptic feedback and piezo sound controller or processor and to a low-frequency speaker, and both the audio controller and low-frequency speaker may be coupled within the base chassis of a C-cover and D-cover assembly at block 816 in an embodiment. For example, in an embodiment described with reference to FIG. 1, an audio controller 134 coupled to a low-frequency speaker 135 via a speaker line 138 may also be coupled to the processor 102 (or speaker) via bus 108, and each of these components may be coupled within the base chassis.

As described herein, by separating the high-frequency, mid-frequency, and low-frequency audio signals, embodiments of the present disclosure allow for placement of low-frequency speakers in locations previously unavailable for disposition of traditional speakers emitting sound in the full spectrum of frequencies. For example, in an embodiment described with reference to FIG. 5, the low-frequency speaker in an embodiment may be situated such that the axis of its port lies parallel to the base chassis 520, and points outward from the interior of the base chassis 520 toward a right-vertical edge 521 of the C-Cover 505, a front-vertical edge 522 of the based chassis 520, a left-vertical edge 523 of the based chassis 520, or a rear-vertical edge of the based chassis 520 (not shown, but situated beneath the digital display 510). This may allow for more optimal configuration of all other components within the base chassis of the information handling system.

At block 818, several components of the information handling system including CPU, GPU, motherboard, memory, power and battery systems, busses and ports, interfaces, thermal management systems and the like may be placed within the base chassis D-cover and C-cover assembly. Assembly of such information handling system components may be according to known methods for mounting processors, memory, and PCB for motherboards, graphics cards, memory or the like.

The C-cover may be coupled to a D-cover to form a base chassis of the information handling system at block 820 in an embodiment. For example, in an embodiment described with reference to FIG. 5, the C-cover 505 may be coupled to the D-cover (not shown, but located beneath the C-cover 505) to form the base chassis 520. In an embodiment, the C-cover may also include a track pad described herein or a standard mechanical touchpad 502. With a haptic keyboard 501 and haptic touchpad 502, a simple uniform coversheet may be used.

At block 822, the base chassis in an embodiment may be coupled to the display chassis via a hinge. For example, in an embodiment described with reference to FIG. 5, the base chassis 520 may be coupled to the display chassis 510. The base chassis 520 and display chassis 510 may form a notebook-type information handling system.

Figure 9:
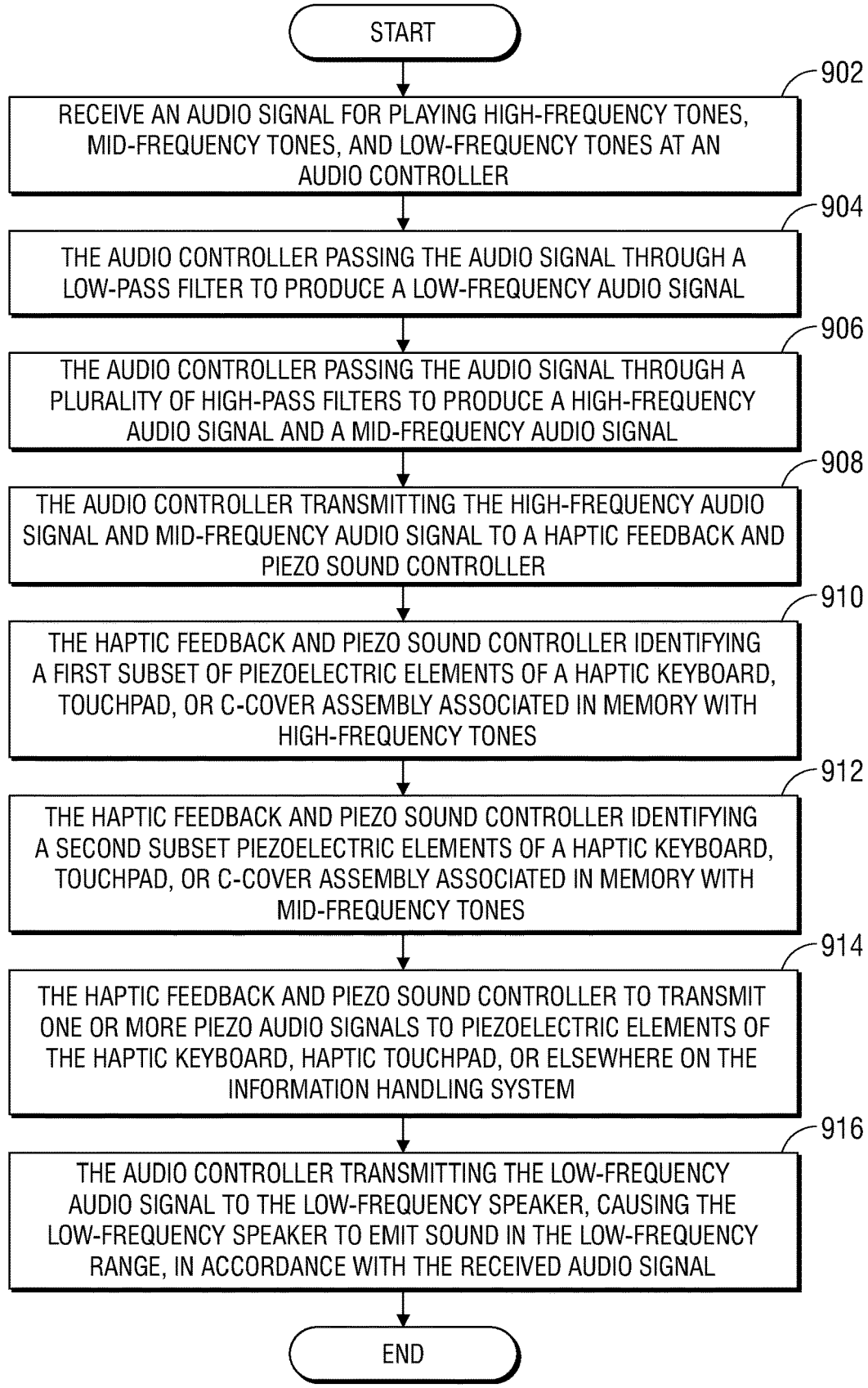
FIG. 9 is a flow diagram illustrating a method of emitting high-frequency and mid-frequency audio signals via piezoelectric elements according to an embodiment of the present disclosure.

FIG. 9 is a flow diagram illustrating a method of emitting high-frequency and mid-frequency audio signals via piezoelectric elements of a haptic keyboard or touchpad according to embodiments of the present disclosure. FIG. 9 may describe in optional embodiments emitting combined high-frequency and mid-frequency audio signals via any piezoelectric elements of the haptic keyboard, haptic touchpad, or other C-cover locations having piezoelectric elements in one example embodiments. In another optional embodiment, high-frequency and mid-frequency audio signals may be divided and allocated to piezoelectric elements of the haptic keyboard, haptic touchpad, or other C-cover locations according to optimal locations for transmission of sound to a user from piezoelectric elements in those high frequency zones or mid frequency zones of the haptic keyboard or haptic touchpad.

As described herein, speakers emitting sound in the mid-frequency and high-frequency ranges may be placed in a limited number of places within a laptop chassis in order to optimize a user's audible experience. In contrast, low-frequency speakers may be placed in several locations within the laptop chassis that are not optimal for mid-frequency and high-frequency speakers, but may still deliver optimal low-frequency sound quality due to the long wavelengths of low frequency sound. Embodiments of the present disclosure emit high-frequency and mid-frequency audio signals via piezoelectric elements situated within a haptic keyboard or touchpad, which may be optimally located for emission of high-frequency and mid-frequency sound. This allows for placement of low-frequency speakers elsewhere within the chassis, in locations that optimize placement of all components of the information handling system.

At block 902, an audio signal for playing high-frequency tones, mid-frequency tones, and low-frequency tones may be received at an audio controller. For example, in an embodiment described with reference to FIG. 1, the audio controller 134 may receive a digital representation of an audio signal. This may take the form of a pulse code modulation of a recorded analog audio signal, for example. Such a pulse code modulation may provide one or more oscillating sound signals (e.g., sine waves) having amplitudes and frequencies that vary over time, as the tone and volume of audible sound generated thereby also varies. In other words, the digital representation of an audio signal may be received at the audio controller in a time domain, where the data of the digital representation plots amplitude of voltage or current over time.

The audio controller in an embodiment may pass the audio signal through a low-pass filter to produce a low-frequency audio signal at block 904. As described herein, the audio controller 134 in an embodiment may identify portions of the digital audio signal falling into each of several frequency domains (e.g., low-frequency, mid-frequency, and high-frequency) by transforming the digital pulse code modulated sound data in a received audio signal from the time domain to the frequency domain, where the amplitude of voltage or current is determined with respect to frequency. For example, upon transforming the digital pulse code modulated sound data to the frequency domain, the audio controller 134 in an embodiment may pass the frequency-domain data through a low-pass band filter to isolate portions of the audio signal having a frequency below a low frequency band cutoff (e.g. 500 Hz+/−200 Hz), to produce a low-frequency audio signal portion and a mid-frequency and high frequency audio signal portion. Upon such a filtering, the audio controller may transform the frequency-domain, low-frequency audio signal low frequency portion and mid and high frequency portions back into a time-domain representation that may be applied to a traditional speaker and to piezoelectric elements in some embodiments of the method of FIG. 9.

At block 906, in an optional embodiment of FIG. 9, the audio controller in an embodiment may pass the audio signal through a plurality of high-pass filters or a band-pass filter to produce a high-frequency audio signal portion separated from a mid-frequency audio signal portion. For example, in an embodiment described with reference to FIG. 1, upon transforming the digital pulse code modulated sound data to the frequency domain, the audio controller in an embodiment may pass the frequency-domain data through a high-pass band filter to remove portions of the frequency-domain data falling below a certain, preset threshold frequency in an embodiment. More specifically, a first high-pass filter may be set to only pass frequencies above a low frequency band cutoff (e.g. 500 Hz+/−200 Hz), which would include high-frequency audio signals and mid-frequency audio signals. This signal may be further separated by sending it through additional filters. For example, the audio controller may apply a second high-pass filter to only pass signals having a frequency above a high frequency band cutoff (e.g. 2,000 Hz+/−600 Hz), to produce a high-frequency audio signal. As another example, the audio controller may apply a low-pass filter to only pass signals at or below a high frequency band cutoff (e.g. 2,000 Hz+/−600 Hz) to produce a mid-frequency audio signal. The above process of separating low, mid, and high frequency audio signals may also use bandpass filters in some embodiments as understood by those of skill. The audio controller in such an embodiment may then transform the frequency domain high-frequency audio signal, and frequency domain mid-frequency audio signal back into the time domain, to produce a high-frequency audio signal and a separate mid-frequency audio signal that can be understood by the haptic feedback and piezo sound controller for some optional embodiments of FIG. 9. In other embodiments, the step of separating high-frequency audio signals and a separate mid-frequency audio signals may be skipped when combined high-frequency and mid-frequency audio signals are to be used to generate sound via the piezoelectric elements in those variations on the embodiment of FIG. 9

The audio controller in an embodiment may transmit the high-frequency and mid-frequency audio signals to a haptic feedback and piezo sound controller or the processor at block 908. For example, in an embodiment described with reference to FIG. 1, the audio controller 134 may transmit the a combined high-frequency and mid-frequency audio signal resulting from box 904 or separate high-frequency and mid-frequency audio signals resulting from box 906 to the haptic feedback and piezo sound controller 140 of the haptic feedback keyboard and touchpad control system 132 via bus 108 in example embodiments for FIG. 9. The processed high-frequency audio signal in such an embodiment may associate a plurality of voltage amplitudes (magnitudes) with a plurality of points in time for all frequencies over a high frequency band cutoff (e.g. 2,000 Hz+/−600 Hz). The processed mid-frequency audio signal in such an embodiment may associate a plurality of voltage amplitudes (magnitudes) with a plurality of points in time for all frequencies between a low frequency band cutoff (e.g. 500 Hz+/−200 Hz) and a high frequency band cutoff (e.g. 2,000 Hz+/−600 Hz).

At block 910, utilizing the separate high-frequency audio signal and a separate mid-frequency audio signal determined at box 906 in some embodiments, the haptic feedback and piezo sound controller may identify a first subset of piezoelectric elements of a haptic keyboard, touchpad, or C-cover assembly associated in memory with high-frequency tones. For example, in an embodiment described with reference to FIG. 5, embodiments of the present disclosure leverage the fact that the keyboard 501 and touchpad 502 are located within the narrow cone of optimal placement for high-frequency and mid-frequency speakers by employing the piezoelectric elements situated beneath these components as high-frequency and mid-frequency speakers. It may be determined in an embodiment, prior to fixing the C-cover 505 to the D-cover (not shown) to enclose the base chassis 520 of the information handling system, that a specific group of piezoelectric elements situated beneath the keyboard 501, touchpad 502, or portions of the C-cover 505 are optimally located for emission of high-frequency sound. For example, it may be determined that piezoelectric elements situated within region 507 are optimally located for emission of high-frequency sound. Upon identification of each of these optimal high-frequency speaker locations, each of the piezoelectric elements falling within these identified regions may be associated in memory with either high-frequency audio or mid-frequency audio. For example, in an embodiment in which region 507 describes optimal placement of high-frequency speakers, the piezoelectric elements situated beneath the keyboard 501, or touchpad 502 within region 507 may be associated in memory with high-frequency audio.

In further utilizing the separate high-frequency audio signal and a separate mid-frequency audio signal determined at box 906, the haptic feedback and piezo sound controller in an embodiment may identify a second subset piezoelectric elements of a haptic keyboard, touchpad, or C-cover assembly associated in memory with mid-frequency tones at block 912 in an optional embodiment. In those embodiments, it may be determined that piezoelectric elements not identified as optimal for emission of high-frequency sound be identified for use as potential mid-frequency audio speakers. For example, in an embodiment described with reference to FIG. 5 in which region 507 is identified as optimal for high-frequency speakers, region 508, or other portions of the keyboard 501, touchpad 502, or C-cover 505 may be identified as optimal for mid-frequency speakers.

At block 914, the haptic feedback and piezo sound controller one or more piezo audio signals to the piezoelectric elements of the haptic keyboard, haptic touchpad, or elsewhere on the information handling system that may operate as a mid-frequency and high frequency speaker according to embodiments of FIG. 9. In a first embodiment, the haptic feedback and piezo sound controller may transmit the piezo audio signal that includes combined mid-frequency and high frequency audio signals determined after a low pass filter is applied at block 904. With this piezo audio signal, one or more piezo electric elements under the haptic keyboard, the haptic touchpad or elsewhere on the C-cover may generate audio playback sounds in the mid and high frequency ranges to accompany any low frequency audio play back sounds created at the low frequency speaker.

In an alternative embodiment at block 914, the haptic feedback and piezo sound controller receives separate high-frequency audio signals and mid-frequency audio signals and sends plural piezo audio signals to designated subsets of piezo electric elements designated to generate high-frequency audio and mid-frequency audio. In an example embodiment, the haptic feedback and piezo sound controller in an embodiment may transmit the high-frequency audio signal to the first subset of piezoelectric elements and the mid-frequency audio signal to the second subset of piezoelectric elements. For example, in an embodiment described with reference to FIG. 5, the haptic feedback and piezo sound controller may transmit the high-frequency audio signal received from the audio controller to the piezoelectric elements situated beneath region 507 of the keyboard 501, and may transmit the mid-frequency audio signal to the piezoelectric elements situated beneath the portion of the keyboard 501 surrounding region 507, beneath the touchpad 502, or beneath another portion of the C-cover 505.

This may cause the first subset of piezoelectric elements to emit audible sound in the high-frequency range, and the second subset of piezoelectric elements to emit audible sound in the mid-frequency range, in accordance with the received audio signals. For example, in an embodiment described with reference to FIG. 3B, the conductive layer of metallic plate or ring 325 of a piezoelectric element (e.g., a piezoelectric element associated in memory with high-frequency sound, or with mid-frequency sound) may apply a haptic sound feedback control signal (e.g., a high-frequency audio signal or mid-frequency audio signal) to the piezoelectric disk material 322 so as to cause the piezoelectric disk material 322 to stretch or shrink depending on the polarity of the signal applied. For example, a positive voltage haptic sound feedback control signal applied to piezoelectric disk material element 322 at soldering point 335 relative to a negative voltage haptic feedback control signal applied at soldering point 340 may cause piezoelectric disk 322 to contract or shrink in embodiments herein. This may, in turn, cause the metallic layer or disk 325 adhered to the ceramic piezoelectric disk 322 to warp upward. By oscillating the voltage (e.g., reversing polarity) of the haptic sound feedback control signals applied to the soldering points 335 and 340 in such a way, the controller in an embodiment may cause the piezoelectric element 320 to move between its upward warped position and downward warped position at the frequency defined by the high-frequency audio signal or the mid-frequency audio signal. Such a movement of the metallic plate or disk 325 in an embodiment may generate high-frequency haptic sound feedback, and mid-frequency haptic sound feedback having tones dictated by the voltage magnitude and frequency of the haptic sound feedback control signal (e.g., high-frequency audio signal or mid-frequency audio signal). This may result in the first subset of piezoelectric elements generating audible high-frequency tones, according to the received high-frequency audio signal, and the second subset of piezoelectric elements generating audible mid-frequency tones, according to the received mid-frequency audio signal.

At block 916, the audio controller in an embodiment may transmit the low-frequency audio signal to the low-frequency speaker, causing the low-frequency speaker to emit sound in the low-frequency range, in accordance with the received low-frequency audio signal. For example, in an embodiment described with reference to FIG. 1, the audio controller 134 may then transmit the time-domain low-frequency audio signal to the low-frequency speaker 136 of the information handling system via speaker line 138 (e.g., coaxial cable) or other connection. The low-frequency speaker 136 in such an embodiment may then emit low-frequency audible sound (e.g., below 500 Hz) according to the digital pulse code modulated sound data (e.g., audio signal). In such a way, the haptic feedback and piezo sound controller and haptic feedback keyboard and touchpad control system in an embodiment may leverage the location of the haptic keyboard and touchpad within the optimal area for locating high-frequency and mid-frequency speakers, and allow for placement of low-frequency speakers elsewhere within the chassis.

The blocks of the flow diagrams of FIGS. 8 and 9 or steps and aspects of the operation of the embodiments herein and discussed herein need not be performed in any given or specified order. It is contemplated that additional blocks, steps, or functions may be added, some blocks, steps or functions may not be performed, blocks, steps, or functions may occur contemporaneously, and blocks, steps or functions from one flow diagram may be performed within another flow diagram.

Devices, modules, resources, or programs that are in communication with one another need not be in continuous communication with each other, unless expressly specified otherwise. In addition, devices, modules, resources, or programs that are in communication with one another may communicate directly or indirectly through one or more intermediaries.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

The subject matter described herein is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents and shall not be restricted or limited by the foregoing detailed description.

What is claimed is:

1. A haptic keyboard based sound system of an information handling system, comprising:
   a coversheet to identify a plurality of key locations of a haptic keyboard and a first key having a piezoelectric element for haptic tactile feedback upon key actuation;
   a support layer;
   a contact foil placed between the coversheet and support layer;
   a haptic feedback and piezo sound controller operatively coupled to the contact foil to:
     receive the mid-frequency portion of an audio signal and the high frequency portion of the audio signal from an audio controller operably connected to the haptic feedback and piezo sound controller; and
     send a piezo audio signal to the piezoelectric element to cause the piezoelectric element to generate a mid-frequency and high-frequency sound audio according to the received mid-frequency portion of an audio signal and the high frequency portion of the audio signal.

2. The haptic keyboard based sound system of claim 1 further comprising:
a low-frequency speaker operably connected to the audio controller; and
the audio controller transmitting a low-frequency audio signal portion of the audio signal to the low-frequency speaker to cause the low-frequency speaker to emit low-frequency sound audio.

3. The haptic keyboard based sound system of claim 1 further comprising:
the haptic feedback and piezo sound controller to:
send a plurality of piezo audio signals to plural piezoelectric elements associated with a plurality of keys of the haptic keyboard to cause the piezoelectric elements to generate mid-frequency and high-frequency sound audio according to the received mid-frequency portion of an audio signal and the high frequency portion of the audio signal.

4. The haptic keyboard based sound system of claim 1 further comprising:
the haptic feedback and piezo sound controller to:
send the plurality of piezo audio signals to plural piezoelectric elements associated with a plurality of keys of the haptic keyboard that are not currently being actuated to cause the piezoelectric elements to generate mid-frequency and high-frequency haptic sound.

5. The haptic keyboard based sound system of claim 1 further comprising:
a haptic touchpad having an array of touchpad piezoelectric elements for haptic tactile feedback upon touchpad actuation;
the haptic feedback and piezo sound controller to:
send a piezo audio signals to a touchpad piezoelectric element associated with the haptic touchpad to cause the haptic touchpad piezoelectric element to generate mid-frequency and high-frequency haptic sound audio according to the received mid-frequency portion of an audio signal and the high frequency portion of the audio signal.

6. The haptic keyboard based sound system of claim 1, wherein the audio controller divides the received mid-frequency and high-frequency portion of the audio signal from a low-frequency audio signal portion of the audio signal for an audio playback.

7. The haptic keyboard based sound system of claim 1, wherein haptic feedback and piezo sound controller sends piezo audio signals to piezoelectric elements situated beneath a portion of a C-cover of the information handling system surrounding the haptic keyboard and a haptic touchpad.

8. A haptic keyboard based sound system of an information handling system, comprising:
a coversheet to identify a plurality of key locations of a haptic keyboard;
a support layer;
a contact foil placed between the coversheet and support layer;
a haptic sound controller operatively coupled to the contact foil to:
receive a high-frequency audio signal from an audio controller operably connected to the haptic sound controller;
identify a first of a plurality of piezoelectric elements placed between the contact foil and the support layer associated in memory with high-frequency audio; and
send a first haptic sound feedback control signal to the first of the plurality of piezoelectric elements to cause the first of the plurality of piezoelectric elements to generate a high-frequency haptic sound feedback according to the high-frequency audio signal.

9. The haptic keyboard based sound system of claim 8 further comprising:
a low-frequency speaker operably connected to the audio controller; and
the audio controller transmitting a low-frequency audio signal to the low-frequency speaker to cause the low-frequency speaker to emit low-frequency audible sound.

10. The haptic keyboard based sound system of claim 8 further comprising:
the haptic sound controller to:
receive a mid-frequency audio signal from the audio controller;
identify a second of the plurality of piezoelectric elements associated in memory with mid-frequency audio; and
send a second haptic sound feedback control signal to the second of the plurality of piezoelectric elements to cause the second of the plurality of piezoelectric elements to generate a mid-frequency haptic sound feedback according to the mid-frequency audio signal.

11. The haptic keyboard based sound system of claim 10, wherein the first of the plurality of piezoelectric elements is situated beneath one of the plurality of key locations of the haptic keyboard, and the second of the plurality of piezoelectric elements is situated beneath a touchpad.

12. The haptic keyboard based sound system of claim 8, wherein the first of the plurality of piezoelectric elements is situated beneath one of the plurality of key locations of the haptic keyboard.

13. The haptic keyboard based sound system of claim 8, wherein the first of the plurality of piezoelectric elements is situated beneath a touchpad.

14. The haptic keyboard based sound system of claim 8, wherein the first of the plurality of piezoelectric elements is situated beneath a portion of a C-cover of the information handling system surrounding the haptic keyboard and the touchpad.

15. A haptic keyboard based sound system of an information handling system, comprising:
a low-frequency speaker operably connected to an audio controller;
the audio controller transmitting a low-frequency portion of an audio signal to the low-frequency speaker separated from a mid-frequency portion of the audio signal and a high frequency portion of the audio signal to cause the low-frequency speaker to emit low-frequency sound audio;
a coversheet to identify a plurality of key locations of a haptic keyboard and a plurality of keys having a plurality of piezoelectric elements for haptic tactile feedback upon key actuation;
a support layer;
a contact foil placed between the coversheet and support layer;
a haptic feedback and piezo sound controller operatively coupled to the contact foil to:
receive the mid-frequency portion of the audio signal and the high frequency portion of the audio signal from an audio controller operably connected to the haptic feedback and piezo sound controller; and
send a piezo audio signal to the piezoelectric element to cause the piezoelectric element to generate a mid-frequency and high-frequency sound audio.

16. The haptic keyboard based sound system of claim 15 further comprising:
the haptic feedback and piezo sound controller;
haptic feedback and piezo sound controller receives the mid-frequency portion of the audio signal and the high frequency portion of the audio signal from an audio controller that is a combined mid frequency and high frequency portion of the audio signal as separated from the low-frequency portion as at the audio controller.

17. The haptic keyboard based sound system of claim 15 further comprising:
the haptic feedback and piezo sound controller;
haptic feedback and piezo sound controller receives the mid-frequency portion of the audio signal and the high frequency portion of the audio signal from an audio controller, where the high frequency portion of the audio signal is a separated high-frequency portion and the mid-frequency portion of the audio signal is a separated mid-frequency portion as filtered at the audio controller.

18. The haptic keyboard based sound system of claim 17 further comprising:
the haptic feedback and piezo sound controller to;
identify a first of a plurality of piezoelectric elements placed between the contact foil and the support layer associated in memory with high-frequency audio;
send a first piezo audio signal to a first of the plurality of piezoelectric elements to cause the first of the plurality of piezoelectric elements to generate a high-frequency haptic sound feedback according to the separated high-frequency portion of the audio signal;
identify a second of the plurality of piezoelectric elements associated in memory with mid-frequency audio; and
send a second haptic sound feedback control signal to the second of the plurality of piezoelectric elements to cause the second of the plurality of piezoelectric elements to generate a mid-frequency haptic sound feedback according to the separated mid-frequency portion of the audio signal.

19. The haptic keyboard based sound system of claim 18, wherein the first of the plurality of piezoelectric elements is situated beneath one of the plurality of keys of a haptic touchpad.

20. The haptic keyboard based sound system of claim 18, wherein the second of the plurality of piezoelectric elements is situated beneath a haptic keyboard.

* * * * *